(12) United States Patent
Yamada et al.

(10) Patent No.: US 10,399,801 B2
(45) Date of Patent: Sep. 3, 2019

(54) MEDIUM TRANSPORT DEVICE AND IMAGE READING APPARATUS

(71) Applicant: SEIKO EPSON CORPORATION, Tokyo (JP)

(72) Inventors: Katsumi Yamada, Matsumoto (JP); Kohei Kozaki, Matsumoto (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/960,696

(22) Filed: Apr. 24, 2018

(65) Prior Publication Data
US 2018/0312351 A1 Nov. 1, 2018

(30) Foreign Application Priority Data

Apr. 28, 2017 (JP) ................................. 2017-089979

(51) Int. Cl.
| | |
|---|---|
| *B65H 1/04* | (2006.01) |
| *H04N 1/00* | (2006.01) |
| *B41J 13/10* | (2006.01) |
| *B65H 31/20* | (2006.01) |

(52) U.S. Cl.
CPC ............. *B65H 1/04* (2013.01); *B41J 13/103* (2013.01); *B41J 13/106* (2013.01); *B65H 31/20* (2013.01); *H04N 1/00623* (2013.01); *H04N 1/00798* (2013.01)

(58) Field of Classification Search
None
See application file for complete search history.

(56) References Cited

U.S. PATENT DOCUMENTS

| | | | | |
|---|---|---|---|---|
| 7,243,915 | B2 * | 7/2007 | Wong | B65H 1/04 |
| | | | | 271/162 |
| 9,802,772 | B2 * | 10/2017 | Sai | B65H 1/04 |
| 2005/0212195 | A1 | 9/2005 | Ohama et al. | |
| 2006/0163798 | A1 * | 7/2006 | Wong | B65H 1/04 |
| | | | | 271/162 |
| 2009/0146362 | A1 | 6/2009 | Yoshioka et al. | |
| 2010/0252987 | A1 | 10/2010 | Furuyama et al. | |
| 2012/0080833 | A1 * | 4/2012 | Asada | B65H 1/266 |
| | | | | 271/3.14 |

(Continued)

FOREIGN PATENT DOCUMENTS

| | | |
|---|---|---|
| JP | 2005-247575 A | 9/2005 |
| JP | 2009-137686 A | 6/2009 |

(Continued)

*Primary Examiner* — Fan Zhang
(74) *Attorney, Agent, or Firm* — Workman Nydegger

(57) ABSTRACT

A medium transport device includes a base frame which includes an outer edge forming portion which configures an outer edge of a device top surface, a medium support tray which is capable of switching between a horizontal posture, and a sub-tray which is capable of being displaced between a storage position and a pulled-out position, and supports the medium at the pulled-out position, in which the sub-tray includes a convex portion which configures a portion of the flat device top surface together at the storage position, and in which the sub-tray is capable of being displaced along a direction that is parallel to the device top surface in a state in which the medium support tray takes the horizontal posture.

20 Claims, 35 Drawing Sheets

(56) References Cited

U.S. PATENT DOCUMENTS

| | | | |
|---|---|---|---|
| 2015/0042036 A1* | 2/2015 | Washino | B65H 1/08 |
| | | | 271/162 |
| 2016/0291520 A1* | 10/2016 | Tatematsu | B65H 1/266 |
| 2017/0015511 A1* | 1/2017 | Suzuki | B65H 1/04 |
| 2018/0257895 A1* | 9/2018 | Kaneko | B65H 31/20 |

FOREIGN PATENT DOCUMENTS

| | | |
|---|---|---|
| JP | 2010-245624 A | 10/2010 |
| JP | 2015-098371 A | 5/2015 |
| JP | 2018-160846 A | 10/2018 |

\* cited by examiner

MEDIUM TRANSPORT DEVICE AND IMAGE READING APPARATUS

BACKGROUND

1. Technical Field

The present invention relates to a medium transport device which transports a medium and an image reading apparatus which is provided with the medium transport device.

2. Related Art

A scanner which is an example of the image reading apparatus may be configured to be provided with an automatic document feeder (also referred to as an ADF) which serves as the medium transport device and to be capable of performing automatic feeding and reading of a plurality of sheets of a document. For the configuration of the automatic document feeder, a configuration may be adopted in which the document is fed out from a paper feed tray, and after being caused to perform a U-turn inversion, the document is read and is discharged to a paper discharge tray.

There is a case in which a stopper is provided on the paper feed tray or the paper discharge tray of the automatic document feeder such that the document does not slip off from the tray. A document stopper body 34 which is provided in a document transporting apparatus described in JP-A-2005-247575 is provided in a recession 35 which is formed in the top surface of a top cover 12 (a paper feed tray portion 13) to be capable of rotational movement. When not in use, the document stopper body 34 is housed so as not to protrude from the top surface, and when in use, protrudes upward, and thus, the document stopper body 34 functions to stop a leading end of the document which is discharged to ensure that the document does not slip off.

Incidentally, in an image reading apparatus, there is a case in which not only the functioning at usage-time but also the functioning at non-usage time is considered important. Specifically, configuring the top surface of the image reading apparatus, that is, the top surface of the automatic document feeder to be a flat shape without unevenness and ensuring that, even if a document or the like is placed on the top surface of the automatic document feeder, the document does not easily slip off and can be placed in a stable manner is exemplified.

The document stopper body 34 described in JP-A-2005-247575 does not functionally contribute to such a demand in any manner and there is room for improvement.

SUMMARY

An advantage of some aspects of the invention is to provide a medium transport device and an image reading apparatus which are capable of further improving the placement properties of a document or the like on the top surface of the medium transport device.

According to an aspect of the invention, a medium transport device includes a base frame which includes an outer edge forming portion which configures an outer edge of a device top surface, a medium support tray which is a tray that supports a medium, is capable of switching between a horizontal posture and an inclined posture, and forms a portion of the flat device top surface together with a top surface of the outer edge forming portion in the horizontal posture, and a sub-tray which is capable of being displaced between a storage position at which the sub-tray is stored on a bottom side of the medium support tray and a pulled-out position at which the sub-tray is pulled out from the bottom side of the medium support tray, and supports the medium together with the medium support tray at the pulled-out position, in which the sub-tray includes a convex portion which configures a portion of the flat device top surface together with a top surface of the outer edge forming portion at the storage position, and in which the sub-tray is capable of being displaced along a direction that is parallel to the device top surface in a state in which the medium support tray takes the horizontal posture.

In this configuration, since the convex portion maintains the same height level between the storage position and the pulled-out position due to the sub-tray being displaced along a direction that is parallel to the device top surface in a state in which the medium support tray takes the horizontal posture, whether the sub-tray is at the storage position or the pulled-out position, the flatness of the device top surface is maintained and it is possible to stably place a medium or the like on the device top surface.

Additionally, if the sub-tray is pulled out to the pulled-out position, the region in which the medium or the like can be placed expands and it is possible to more favorably place the medium or the like on the device top surface.

The expression "flat device top surface" does not mean in a strict sense that the device top surface is flat, but means that the device top surface has an overall flat shape even including a little unevenness and that a degree of flatness is maintained at which a medium does not easily slip off even if the medium is placed on the device top surface.

In the medium transport device, a cutout portion may be formed in the outer edge forming portion, and the convex portion of the sub-tray may fill the cutout portion at the storage position to configure a portion of the flat device top surface together with the top surface of the outer edge forming portion.

In the medium transport device, at least the top surface of the outer edge forming portion and the top surface of the convex portion may be embossed surfaces.

In this configuration, since at least the top surface of the outer edge forming portion and the top surface of the convex portion are embossed surfaces, in a case in which a medium or the like is placed on the device top surface, a slipping suppression effect is obtained and it is possible to more stably place the medium or the like on the device top surface.

In the medium transport device, the medium support tray may switch between the inclined posture and the horizontal posture by rocking, and the sub-tray may be capable of being displaced to the pulled-out position regardless of the posture of the medium support tray.

In this configuration, in a configuration in which the sub-tray is capable of being displaced to the pulled-out position regardless of the posture of the medium support tray, similar operations and effects may be obtained to those of the configurations which are described above.

The medium transport device may further include a link mechanism which displaces the sub-tray in accordance with posture changing of the medium support tray.

In this configuration, since the link mechanism which displaces the sub-tray in accordance with posture changing of the medium support tray is provided, it is not necessary to individually manipulate the medium support tray and the sub-tray and the manipulability is improved.

In the medium transport device, when the medium support tray takes the horizontal posture and the medium support tray performs posture switching toward the inclined posture from a state in which the sub-tray is at the storage position, the sub-tray may be pulled out from the bottom side of the medium support tray and may be displaced to the pulled-out position.

In this configuration, it is possible to displace the sub-tray to the pulled-out position due to the medium support tray switching posture toward the inclined posture.

In the medium transport device, when the medium support tray takes the inclined posture and the medium support tray performs posture switching toward the horizontal posture from a state in which the sub-tray is at the pulled-out position, the sub-tray may be displaced from the pulled-out position to the storage position.

In this configuration, it is possible to displace the sub-tray to the storage position due to the medium support tray switching posture toward the horizontal posture.

In the medium transport device, the posture of the medium support tray may be restricted by the sub-tray and the medium support tray may change posture in accordance with a displacement operation of the sub-tray.

In this configuration, since the posture of the medium support tray is restricted by the sub-tray and the medium support tray changes posture in accordance with the displacement operation of the sub-tray, that is, the medium support tray changes posture by manipulating the sub-tray instead of manipulating the medium support tray, the manipulability is still further improved.

In the medium transport device, the sub-tray may be configured to include a first tray, a second tray which is capable of sliding with respect to the first tray and is provided with the convex portion, and a second tray biasing unit which biases the second tray in a direction in which the second tray protrudes from the first tray.

In this configuration, since the sub-tray is configured by a plurality of members (at least the first tray and the second tray) and the second tray is biased in a direction in which the second tray protrudes from the first tray, it is possible to suppress an impedance to the posture changing of the medium support tray even if the sub-tray abuts on an obstacle or the like when the sub-tray is displaced to the pulled-out position in accordance with the posture changing of the medium support tray using the action of the link mechanism. In addition, it is possible to suppress the damage to the sub-tray and the link mechanism.

The medium transport device may further include a sub-tray biasing unit which biases the sub-tray toward the pulled-out position, and a restricting unit which restricts displacement of the sub-tray from the storage position to the pulled-out position in a state in which the medium support tray is in the horizontal posture, in which when the medium support tray performs posture switching toward the inclined posture from a state in which the medium support tray takes the horizontal posture and the sub-tray is at the storage position, positional restriction of the sub-tray by the restricting unit may be released and the sub-tray may be displaced from the storage position to the pulled-out position by a biasing force of the sub-tray biasing unit.

In this configuration, when the medium support tray performs the posture switching toward the inclined posture, since a configuration is adopted in which the positional restriction of the sub-tray by the restricting unit is released and the sub-tray is displaced from the storage position to the pulled-out position by the biasing force of the sub-tray biasing unit, it is possible to displace the sub-tray to the pulled-out position without manipulating the sub-tray and the manipulability is improved.

The medium transport device may further include a push latch mechanism which releases holding of the sub-tray at the storage position by a pushing-in manipulation of the sub-tray which is at the storage position and biases the sub-tray toward the pulled-out position.

In this configuration, it is possible to pull out the sub-tray to the pulled-out position with easy manipulability.

In the medium transport device, at least a portion of an area in which the cutout portion is formed in the outer edge forming portion of the base frame may be configured as an opening-closing portion which is capable of opening and closing.

In this configuration, since at least a portion of the area in which the cutout portion is formed in the outer edge forming portion of the base frame is configured as an opening-closing portion which is capable of opening and closing, it is possible to use the inside space of the base frame by opening the opening-closing portion. For example, it is possible to form the medium transport path at the bottom side of the sub-tray and discharge the medium via the opening-closing portion.

In the medium transport device, a medium transport path for transporting the medium may be positioned in a bottom side region of the sub-tray.

In this configuration, in a configuration in which the medium transport path for transporting the medium is positioned in the bottom side region of the sub-tray, similar operations and effects may be obtained to those of the configurations which are described above.

In the medium transport device, the medium support tray may be a tray which supports the medium which is subjected to reading and is discharged.

In this configuration, in a configuration in which the medium support tray is a tray which supports the medium which is subjected to reading and is discharged, similar operations and effects may be obtained to those of the configurations which are described above.

In the medium transport device, the flat device top surface may be formed by at least the medium support tray which is in the horizontal posture, the outer edge forming portion, the convex portion, a feed tray which is positioned closer to a downstream side in a medium feed direction than the medium support tray and supports the medium which is fed, and an opening-closing body which is positioned closer to the downstream side in the medium feed direction than the feed tray and opens and closes at least a portion of a medium transport path.

In this configuration, in a configuration in which the flat device top surface is further formed by the feed tray and the opening-closing body in addition to the medium support tray, the outer edge forming portion, and the convex portion, similar operations and effects may be obtained to those of the configurations which are described above.

In the medium transport device, the medium support tray may be a tray which supports the medium which is fed.

In this configuration, in a configuration in which the medium support tray is a tray which supports the medium which is fed, similar operations and effects may be obtained to those of the configurations which are described above.

According to another aspect of the invention, an image reading apparatus includes a reader which reads a medium, and the medium transport device.

In this configuration, in the image reading apparatus, similar operations and effects may be obtained to those of the configurations which are described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
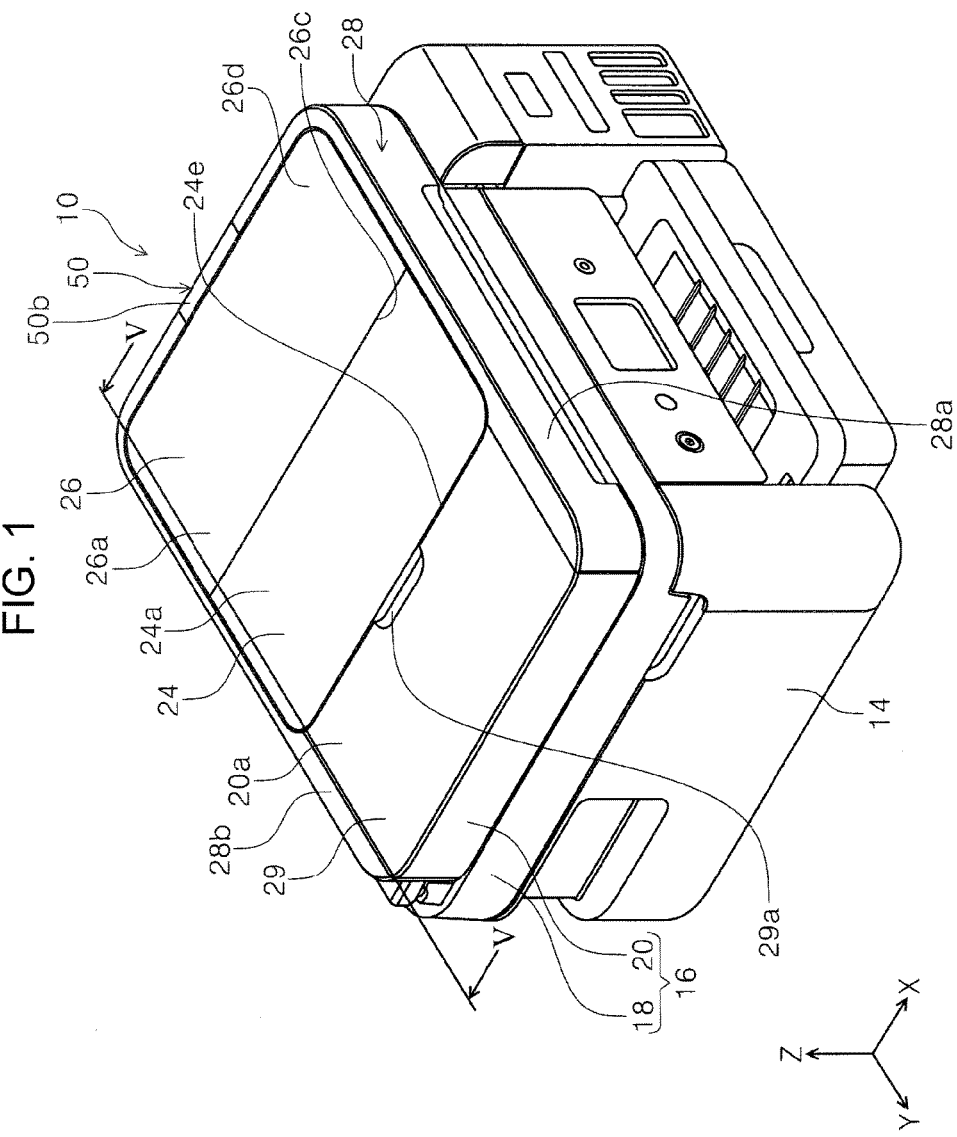
FIG. 1 is an external perspective view illustrating a non-feeding state of an image reading apparatus of a printer according to the invention.

Hereinafter, a description will be given of an embodiment of the invention based on the drawings. Regarding configurations which are the same in the examples, the same reference numerals will be given, a description will be given only in the first example, and the description of the configurations will be omitted in the following examples.

Figure 2:
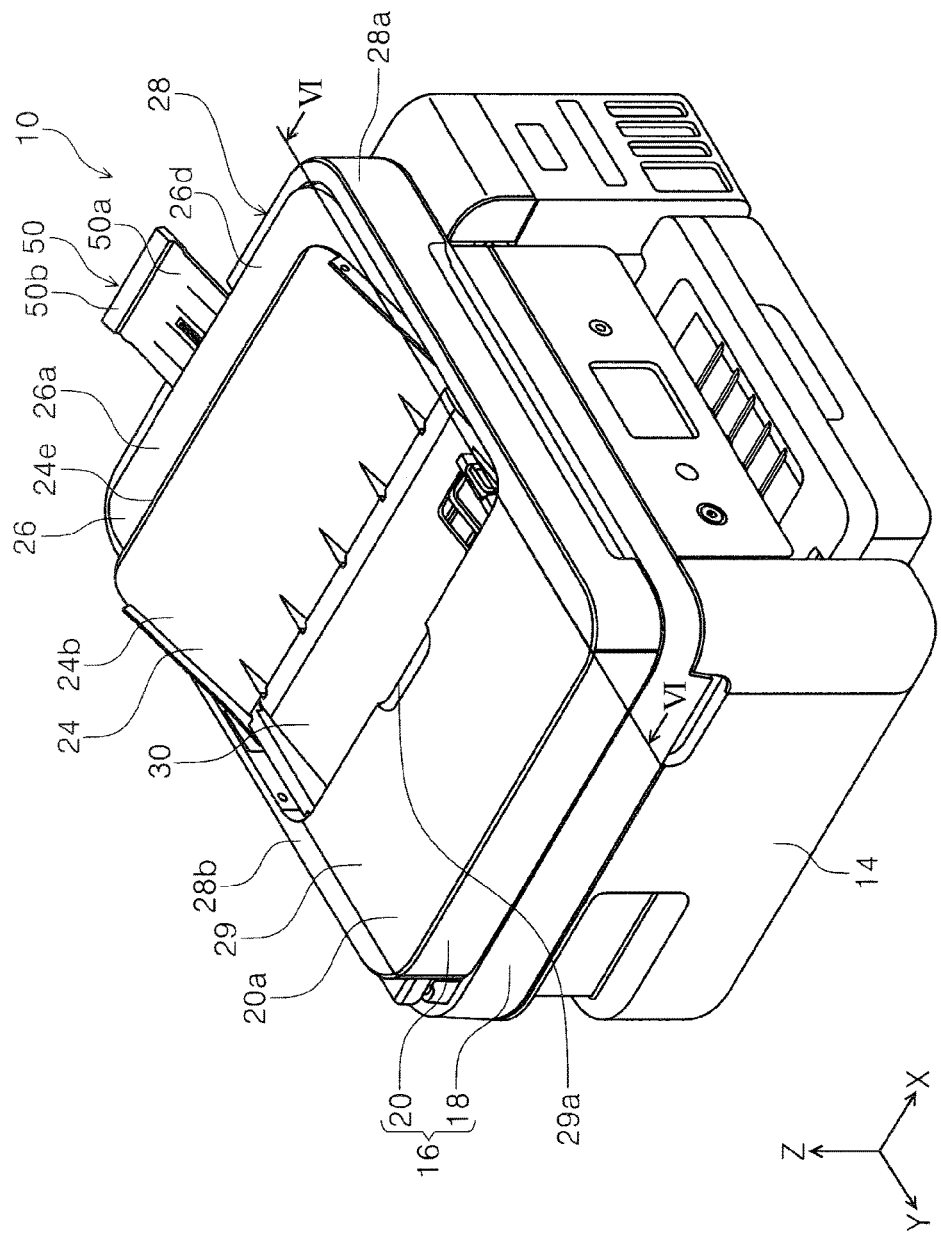
FIG. 2 is an external perspective view illustrating a feeding state of the image reading apparatus of the printer according to the invention.
Figure 3:
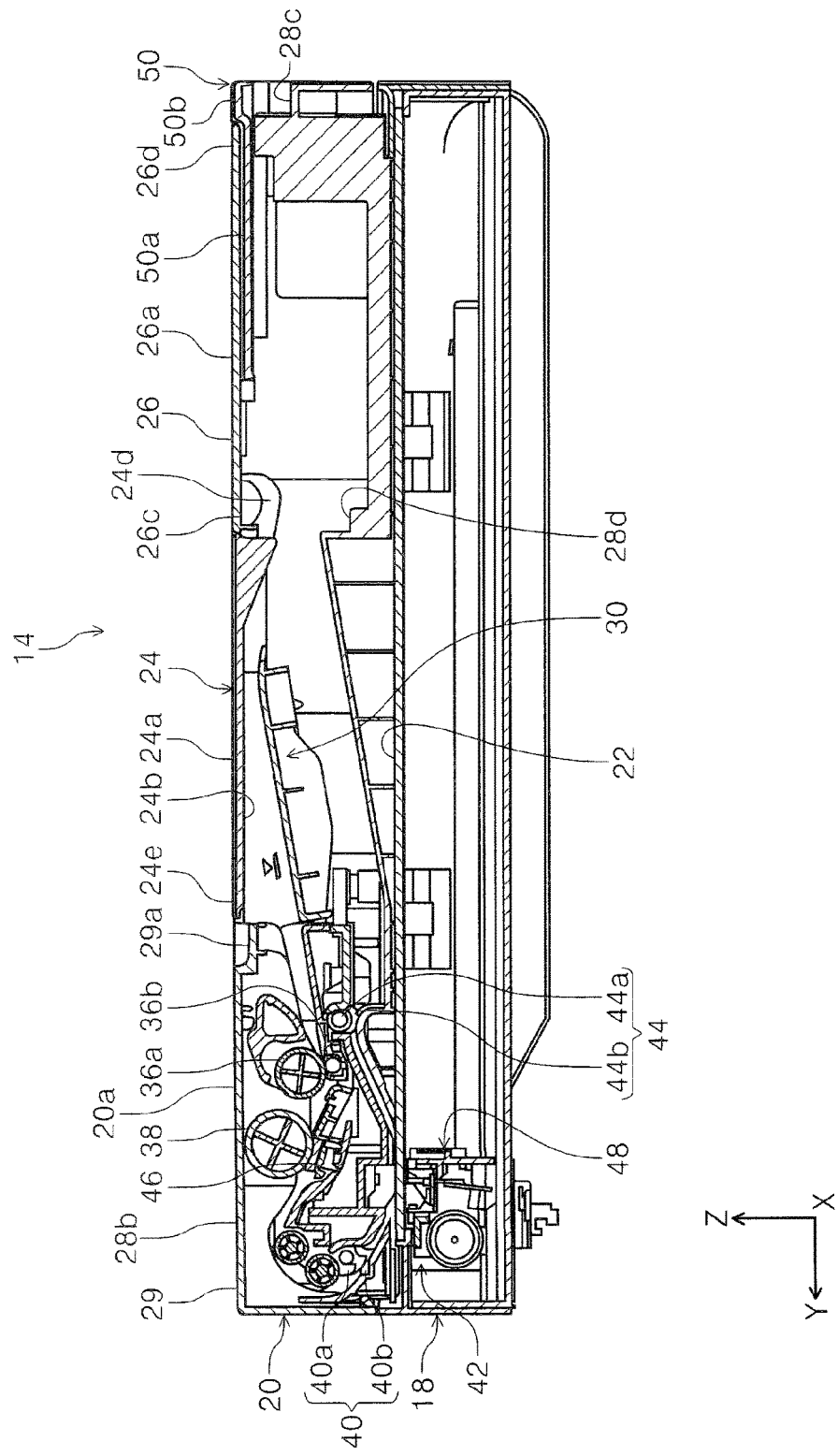
FIG. 3 is a lateral sectional diagram illustrating a document transport path in the non-feeding state of the image reading apparatus according to the invention.
Figure 4:
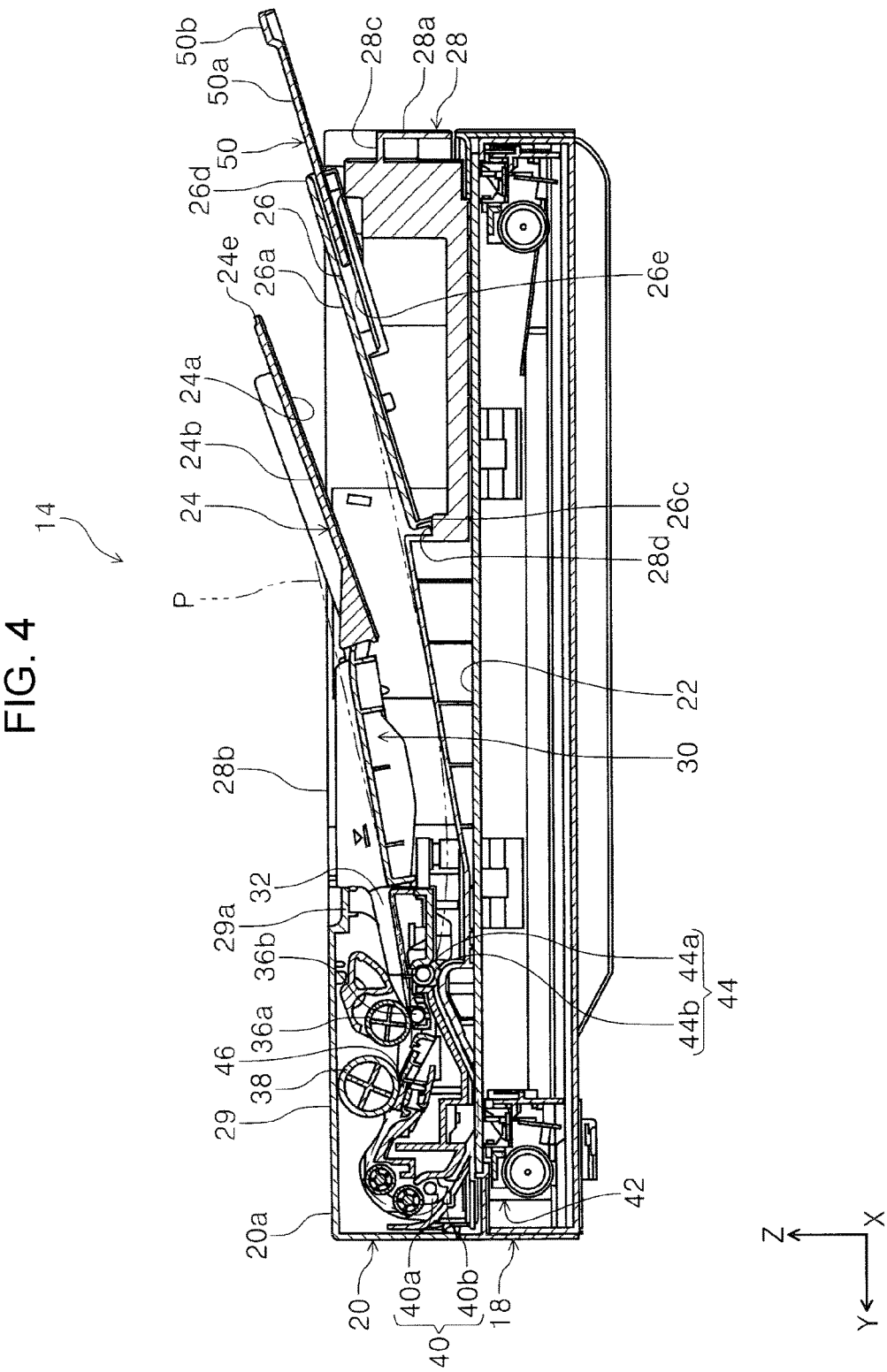
FIG. 4 is a lateral sectional diagram illustrating the document transport path in the feeding state of the image reading apparatus according to the invention.
Figure 5:
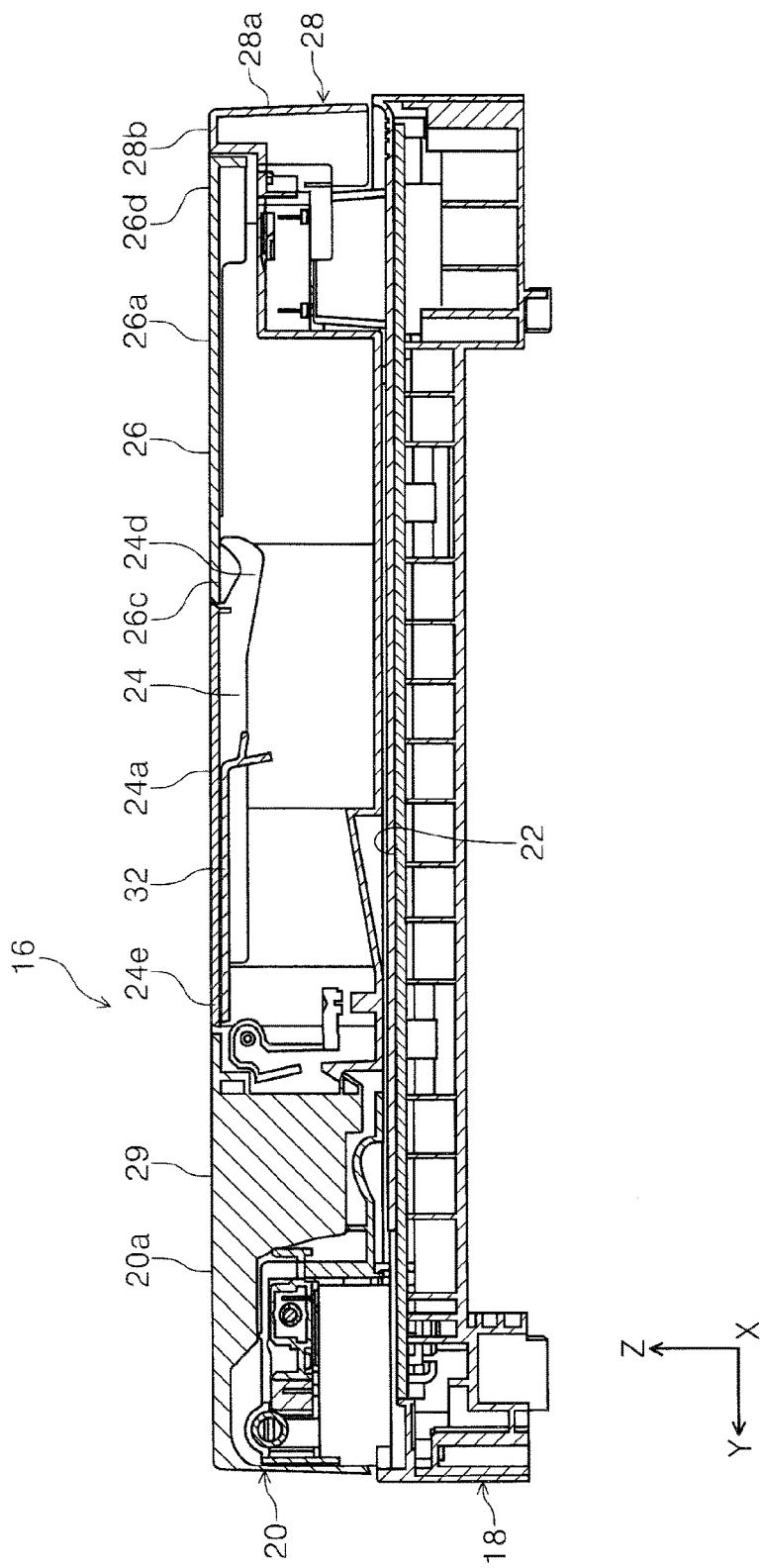
FIG. 5 is a sectional diagram taken along a line V-V of FIG. 1.

FIG. 1 is an external perspective view illustrating a non-feeding state of an image reading apparatus of a printer according to the invention, FIG. 2 is an external perspective view illustrating a feeding state of the image reading apparatus of the printer according to the invention, FIG. 3 is a lateral sectional diagram illustrating a document transport path in the non-feeding state of the image reading apparatus according to the invention, FIG. 4 is a lateral sectional diagram illustrating the document transport path in the feeding state of the image reading apparatus according to the invention, and FIG. 5 is a sectional diagram taken along a line V-V of FIG. 1.

Figure 6:
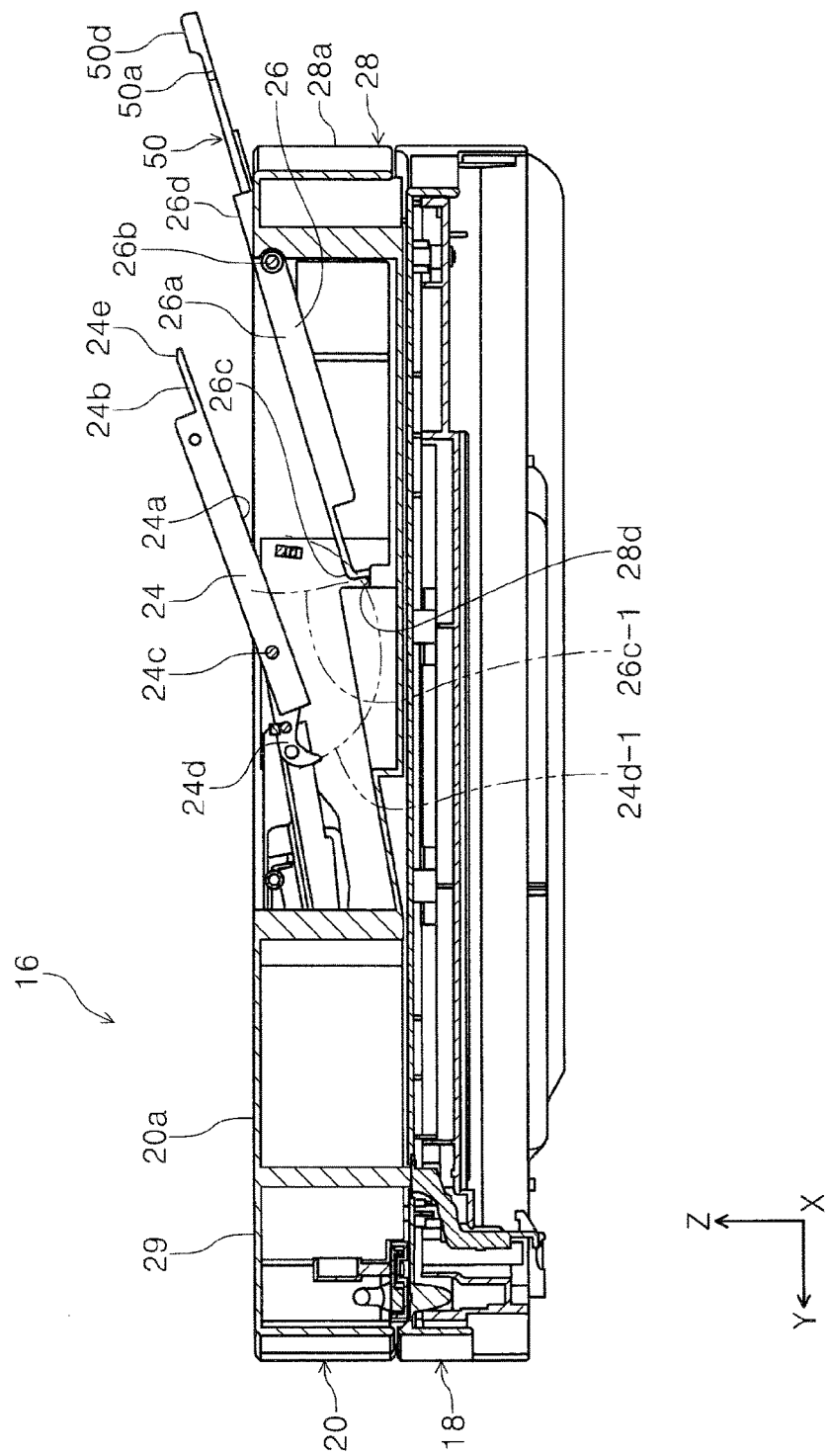
FIG. 6 is a sectional diagram taken along a line VI-VI of FIG. 2.
Figure 7:
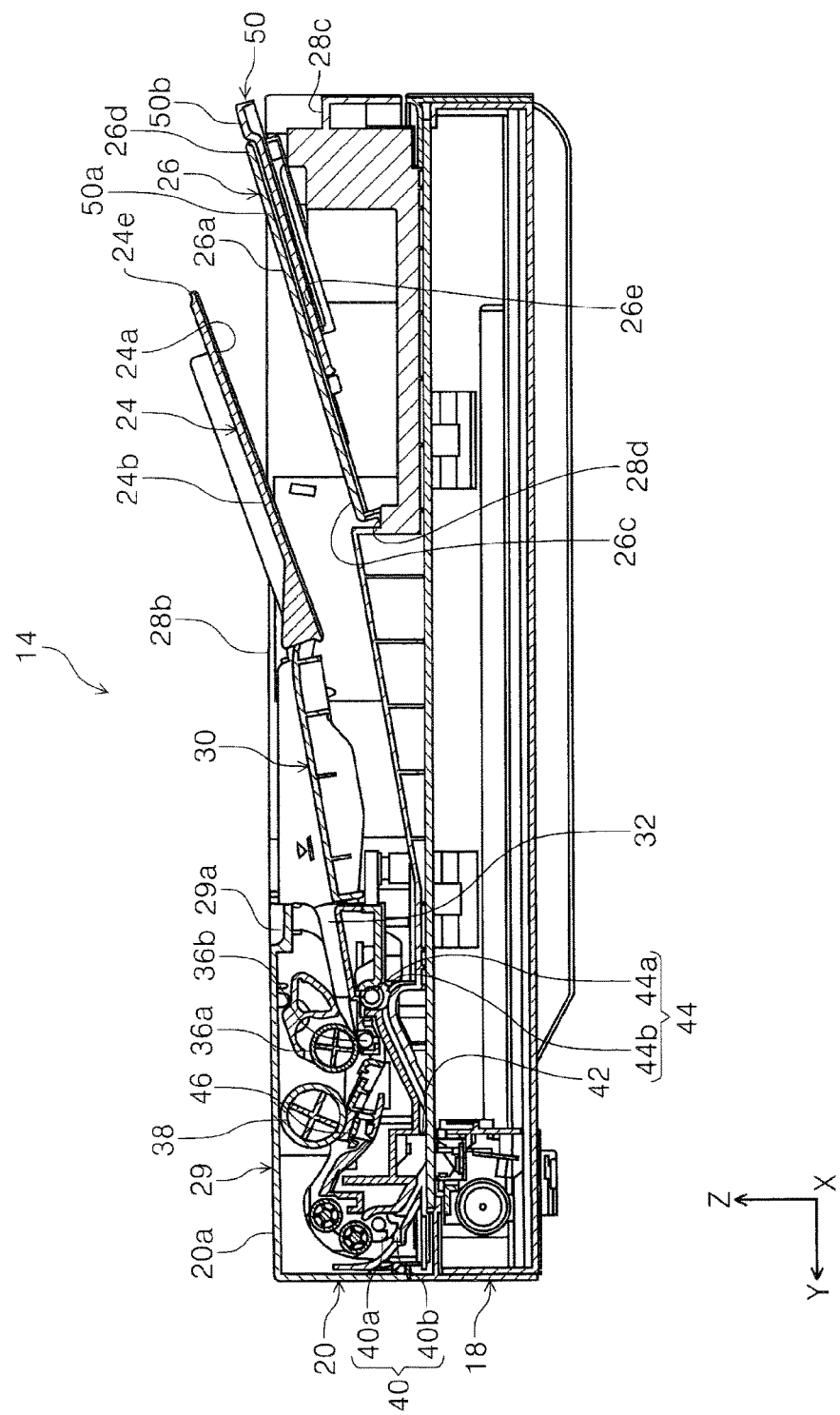
FIG. 7 is a lateral sectional diagram illustrating the document transport path in a state in which a sub-tray is stored in a document support tray.
Figure 8:
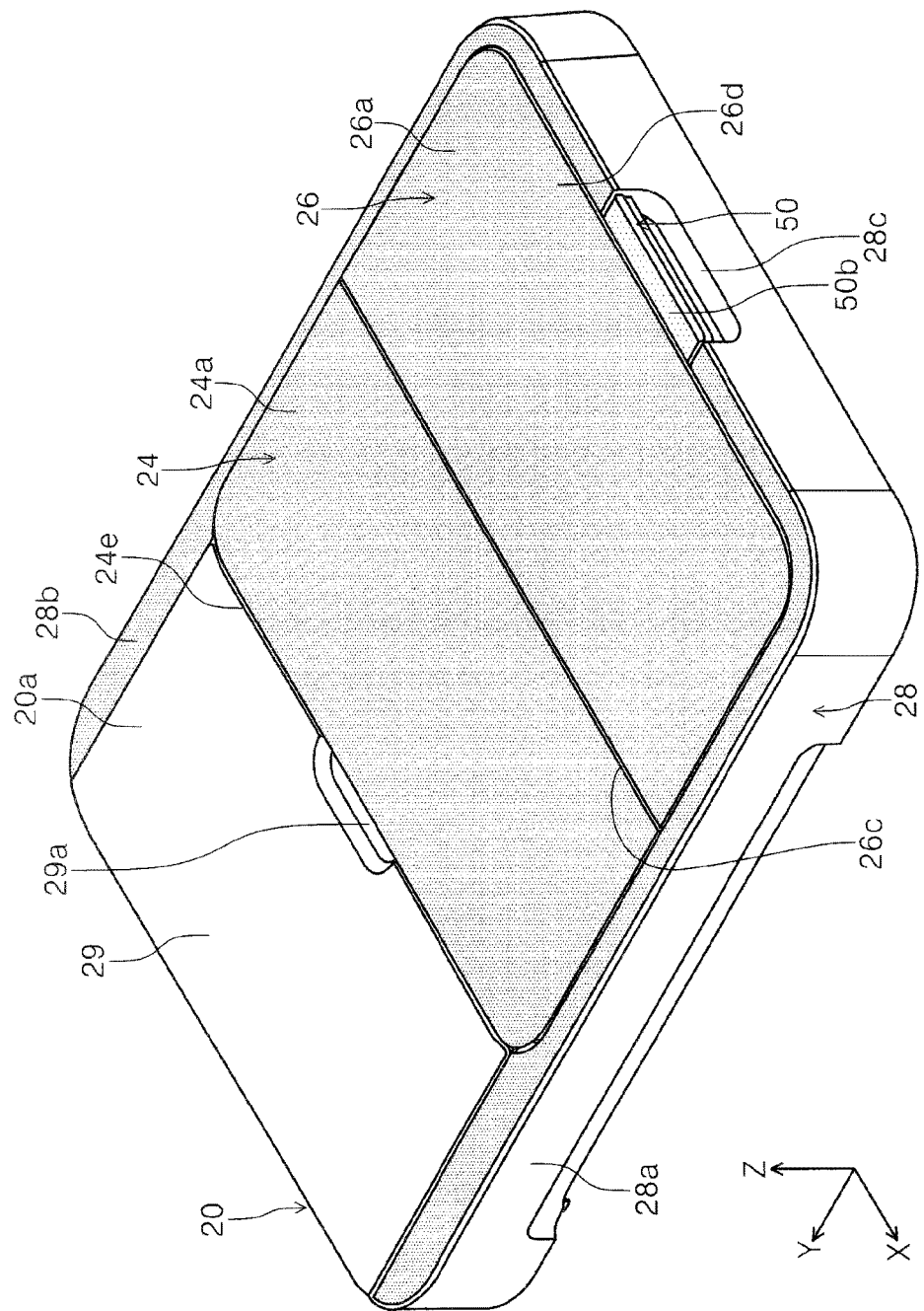
FIG. 8 is a perspective view of the image reading apparatus in the state in which the sub-tray is stored in the document support tray.
Figure 9:
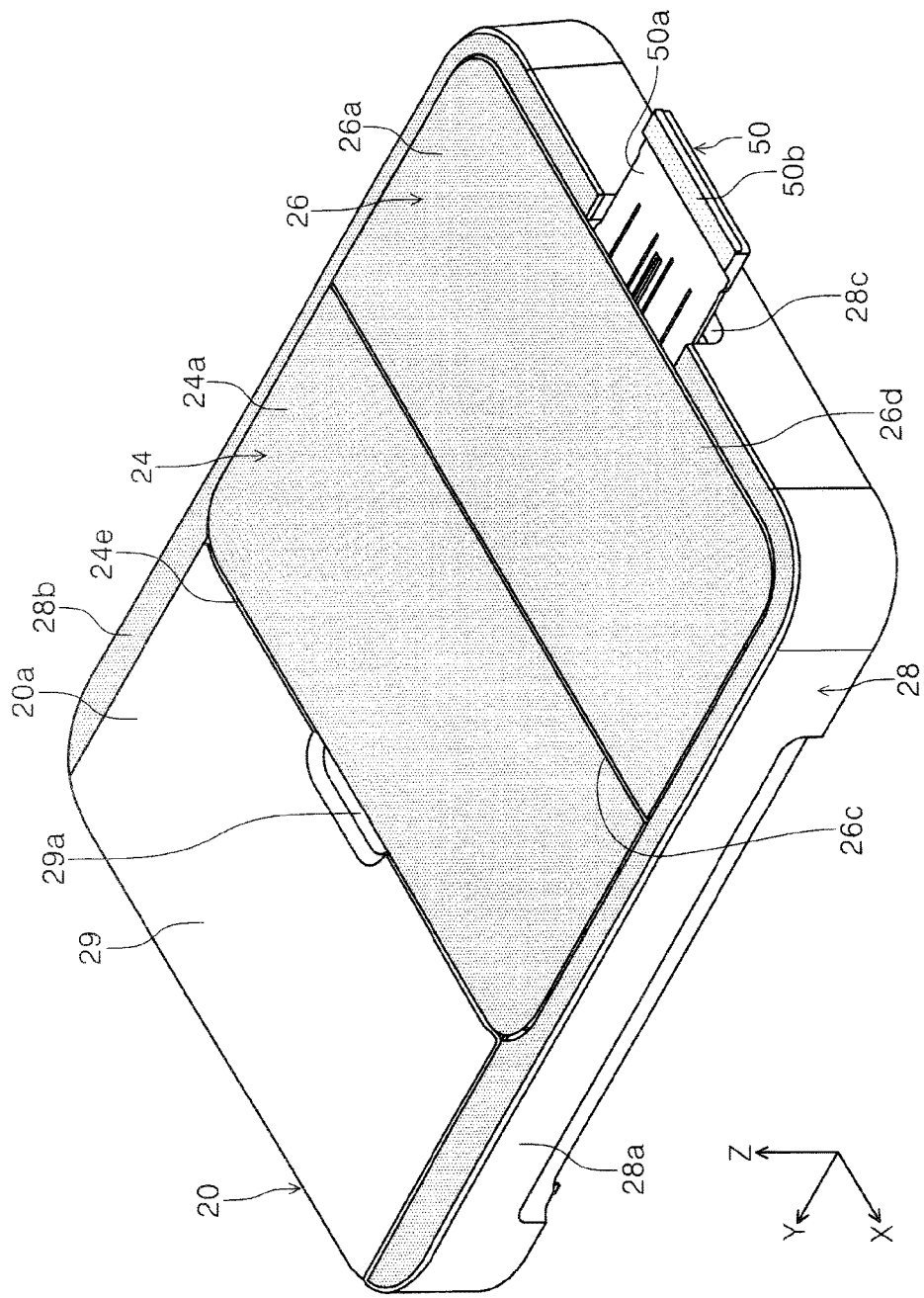
FIG. 9 is a perspective view of the image reading apparatus in a state in which the sub-tray is pulled out from the document support tray.
Figure 10:
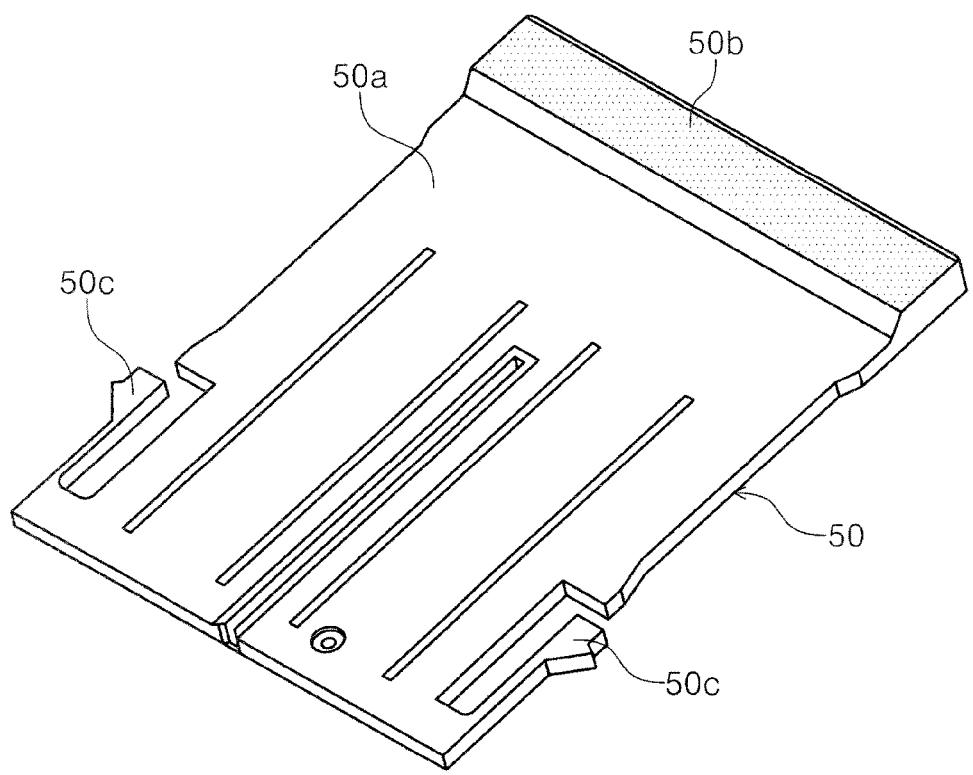
FIG. 10 is a perspective view of the sub-tray.

FIG. 6 is a sectional diagram taken along a line VI-VI of FIG. 2, FIG. 7 is a lateral sectional diagram illustrating the document transport path in a state in which a sub-tray is stored in a document support tray, FIG. 8 is a perspective view of the image reading apparatus in the state in which the sub-tray is stored in the document support tray, FIG. 9 is a perspective view of the image reading apparatus in a state in which the sub-tray is pulled out from the document support tray, and FIG. 10 is a perspective view of the sub-tray.

Figure 11:
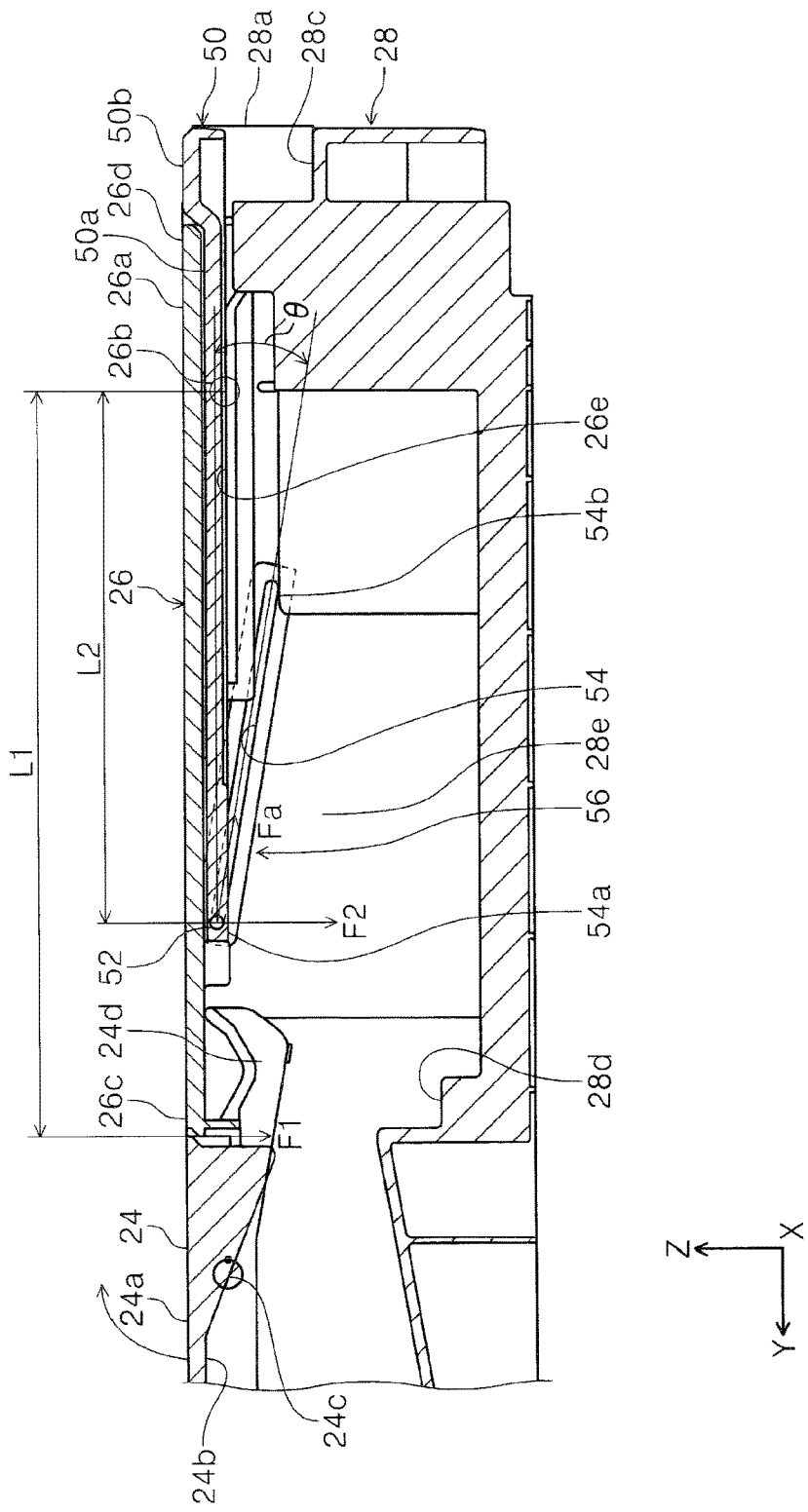
FIG. 11 is a lateral diagram illustrating a non-feeding state of an image reading apparatus according to a second example.
Figure 12:
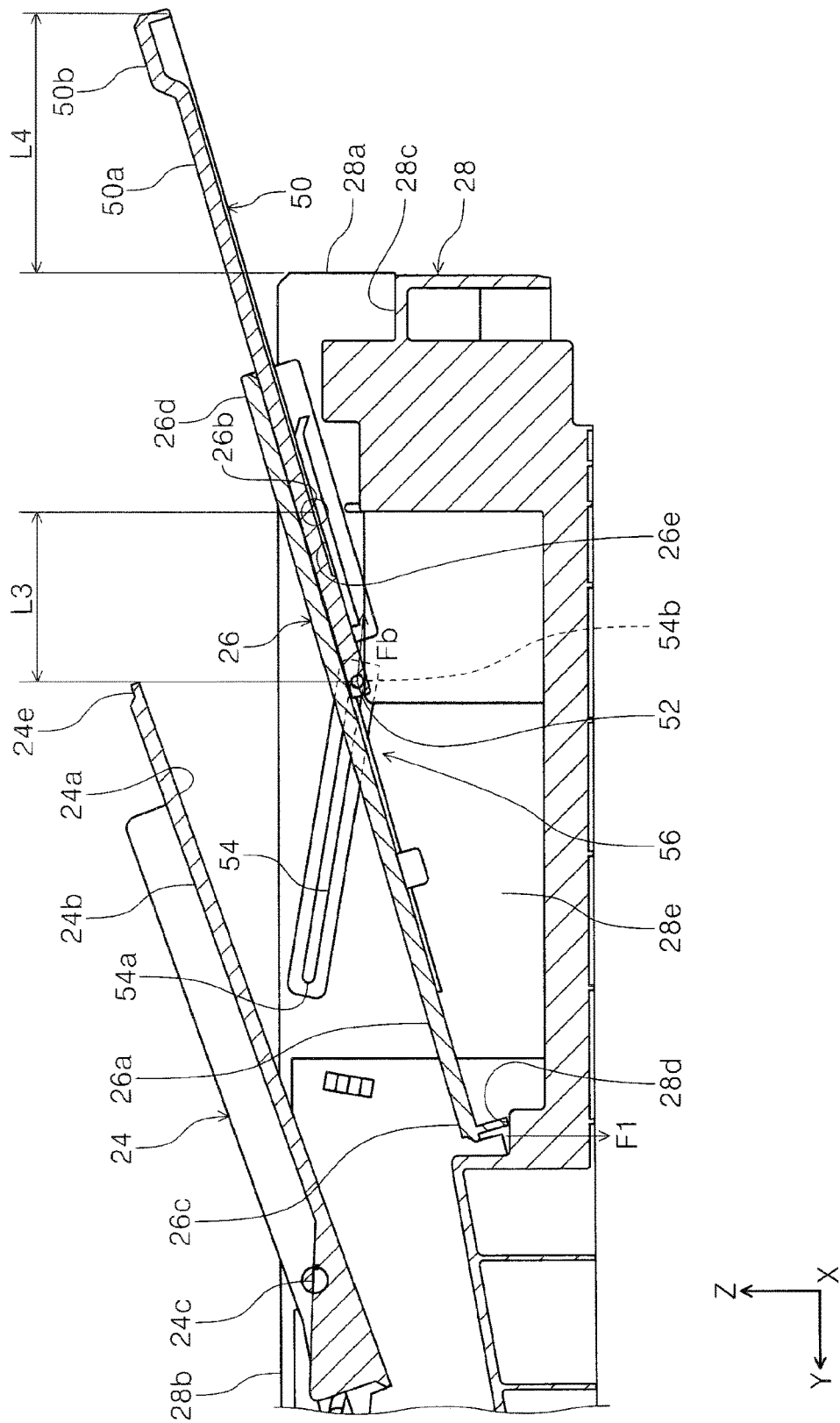
FIG. 12 is a lateral diagram illustrating a feeding state of the image reading apparatus according to the second example.
Figure 13:
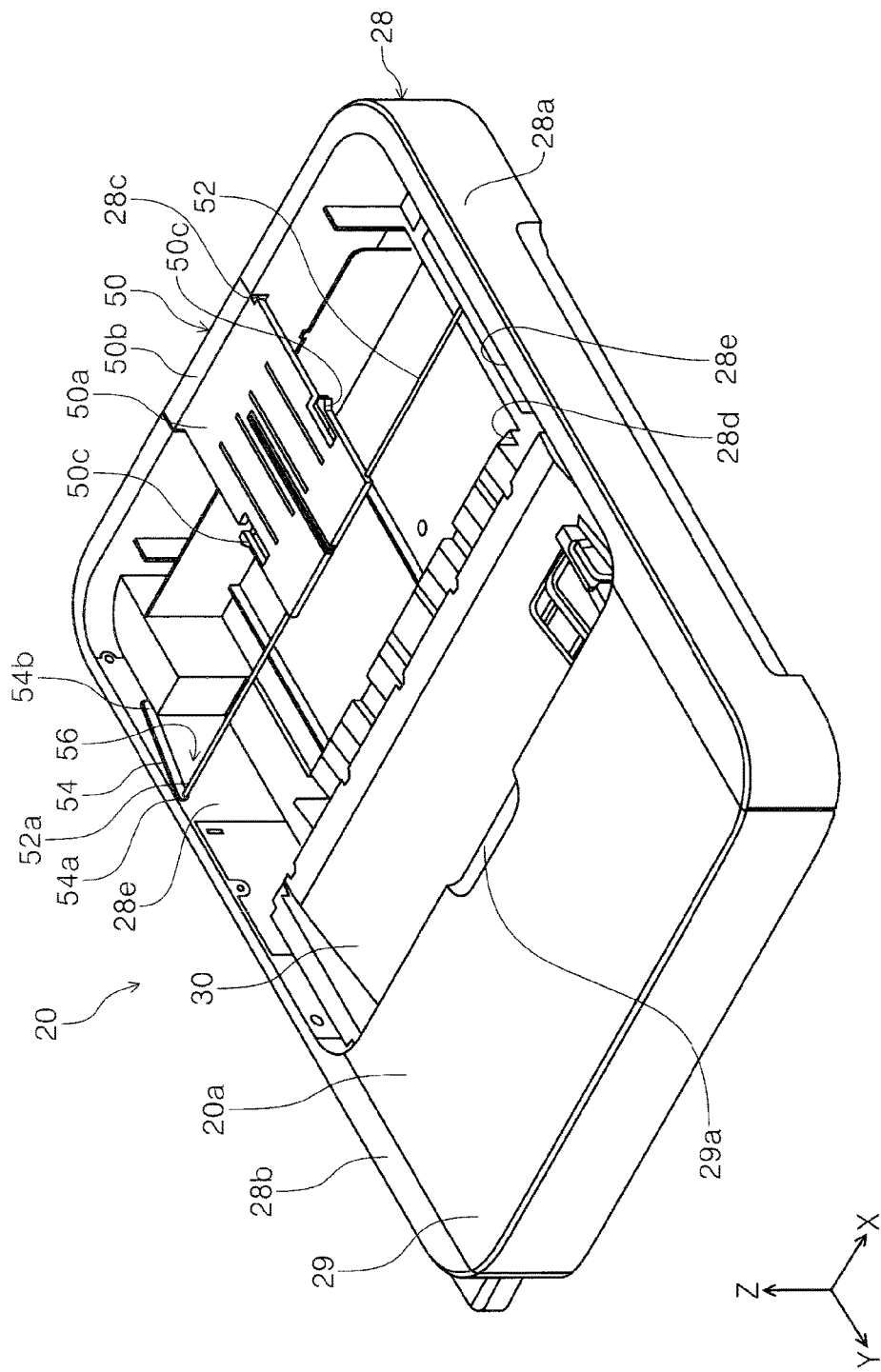
FIG. 13 is a perspective view illustrating a sub-tray in the non-feeding state in the image reading apparatus according to the second example.
Figure 14:
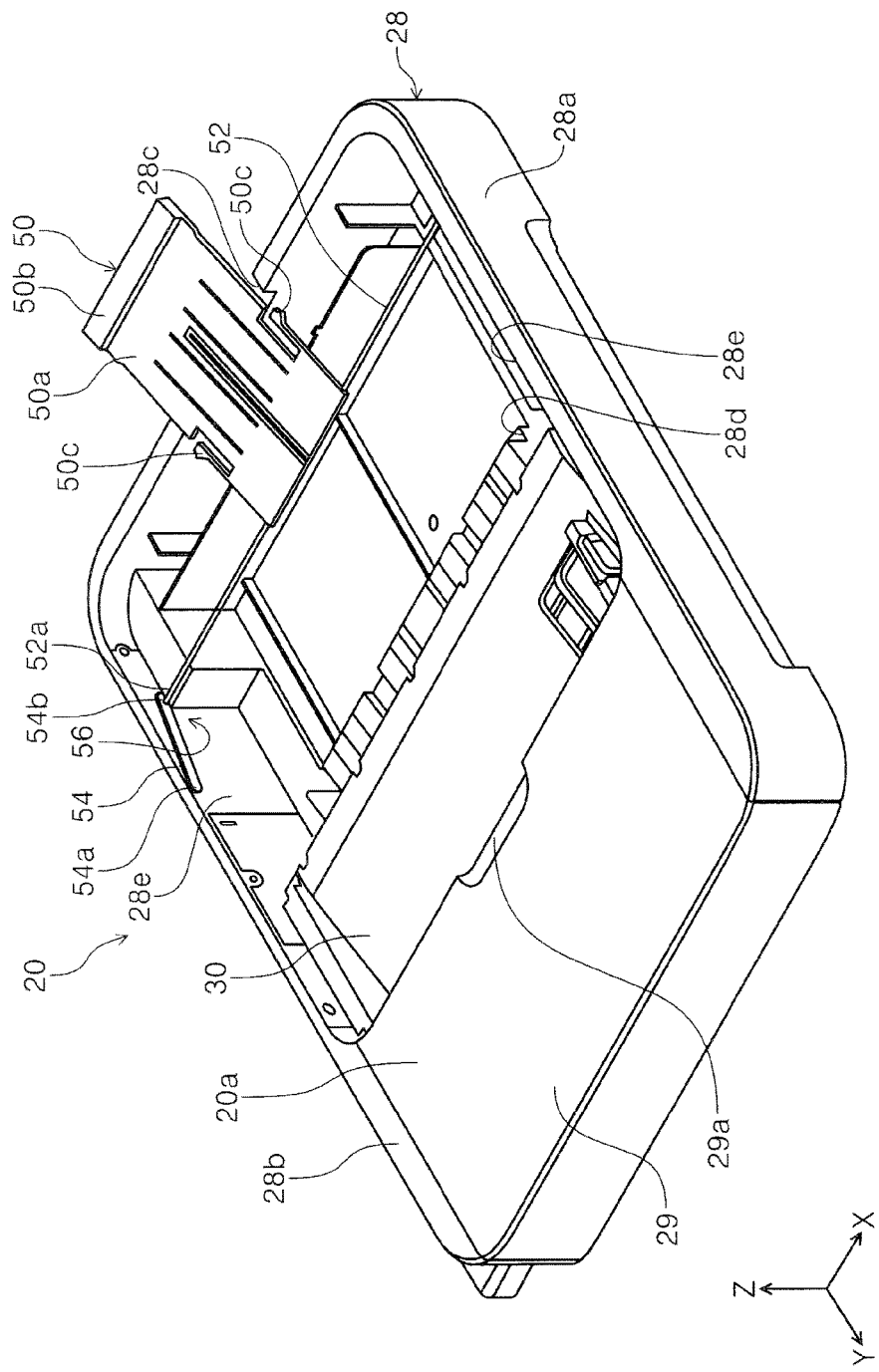
FIG. 14 is a perspective view illustrating the sub-tray in the feeding state in the image reading apparatus according to the second example.
Figure 15:
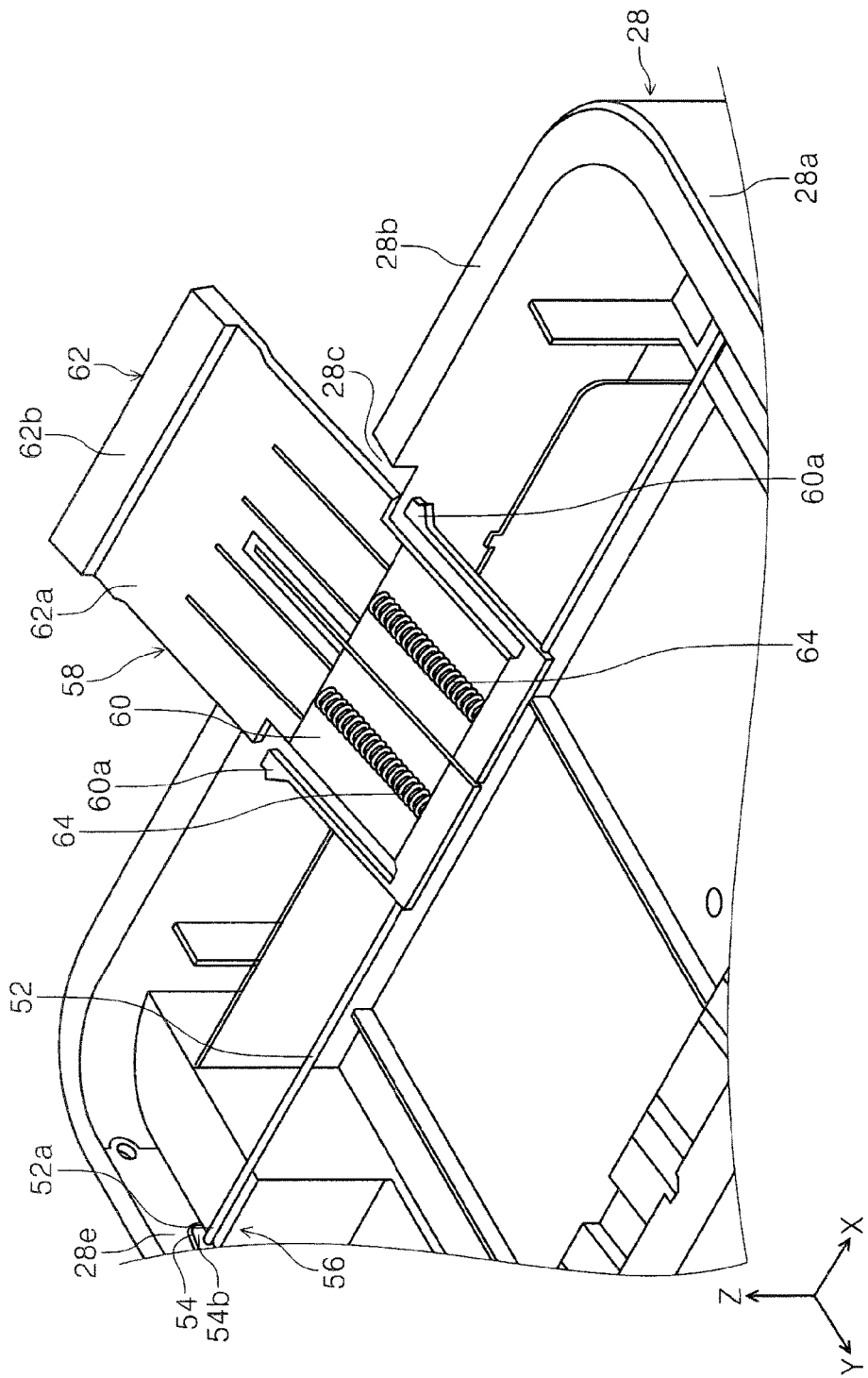
FIG. 15 is a perspective view illustrating a configuration of the sub-tray in a modification example of the second example.

FIG. 11 is a lateral diagram illustrating a non-feeding state of an image reading apparatus according to a second example, FIG. 12 is a lateral diagram illustrating a feeding state of the image reading apparatus according to the second example, FIG. 13 is a perspective view illustrating a sub-tray in the non-feeding state in the image reading apparatus according to the second example, FIG. 14 is a perspective view illustrating the sub-tray in the feeding state in the image reading apparatus according to the second example, and FIG. 15 is a perspective view illustrating a configuration of the sub-tray in a modification example of the second example.

Figure 16:
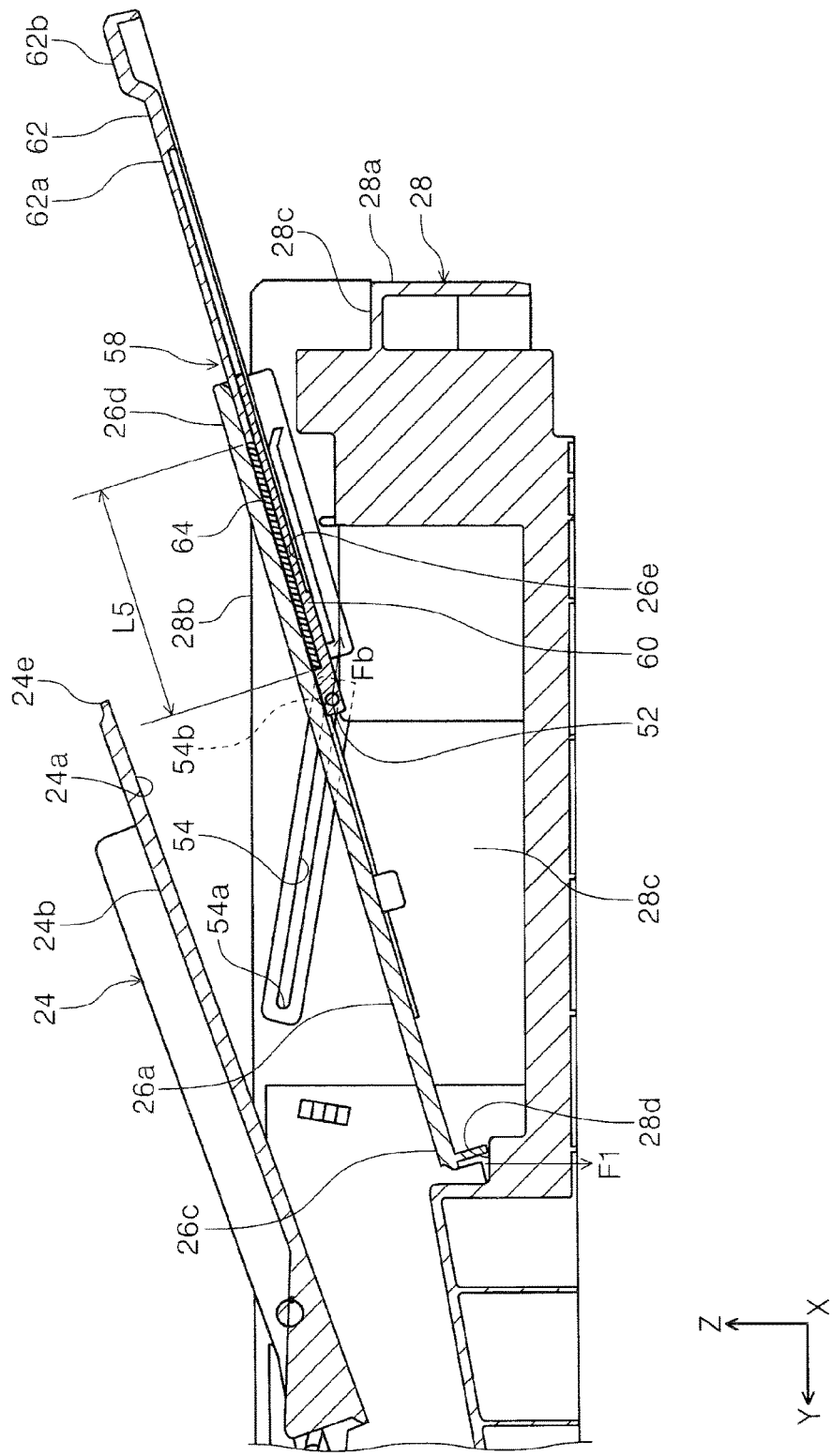
FIG. 16 is a lateral sectional diagram of the feeding state of the sub-tray in the modification example of the second example.
Figure 17:
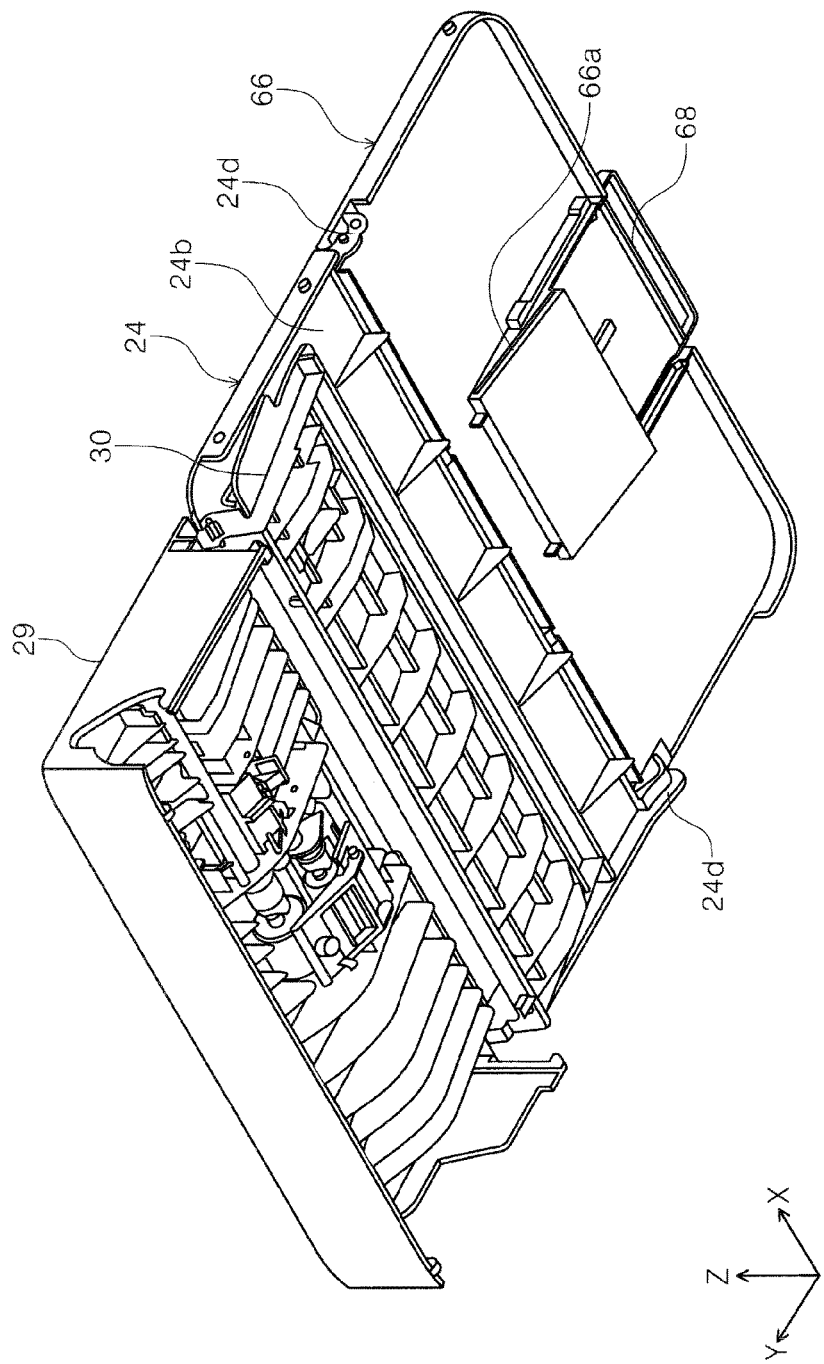
FIG. 17 is a perspective view illustrating a non-feeding state of a document support tray and a sub-tray according to a third example from a bottom side in the apparatus height direction.
Figure 18:
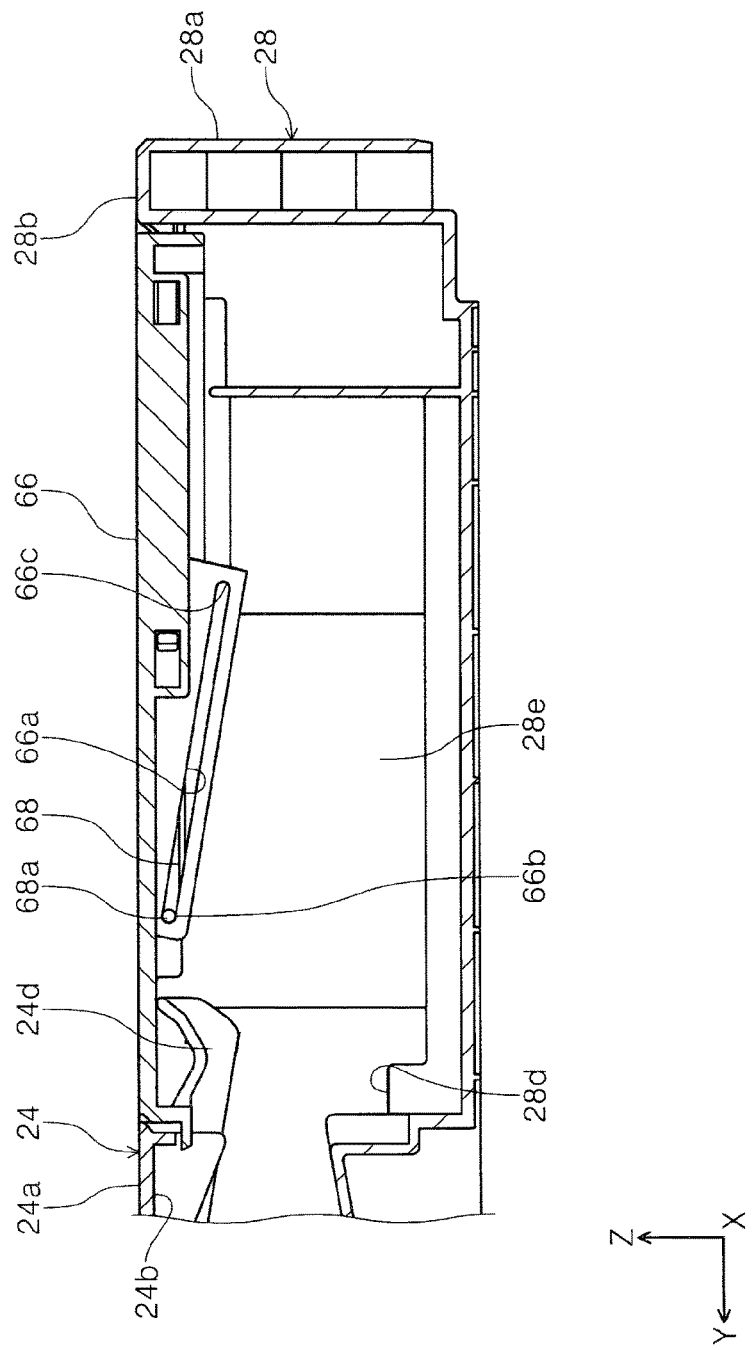
FIG. 18 is a lateral sectional diagram illustrating the non-feeding state of the document support tray and the sub-tray according to the third example.
Figure 19:
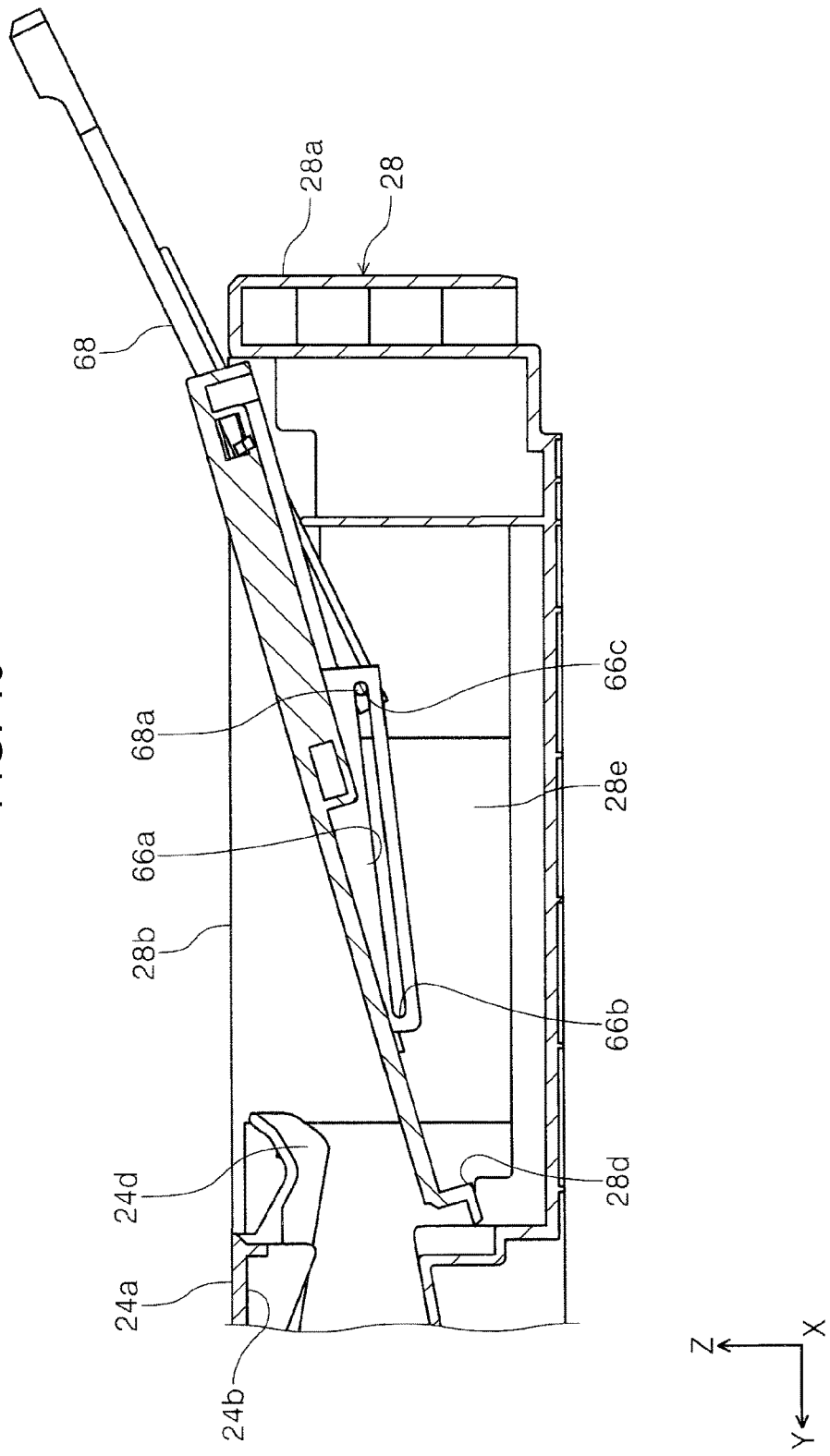
FIG. 19 is a lateral sectional diagram illustrating the feeding state of the document support tray and the sub-tray according to the third example.
Figure 20:
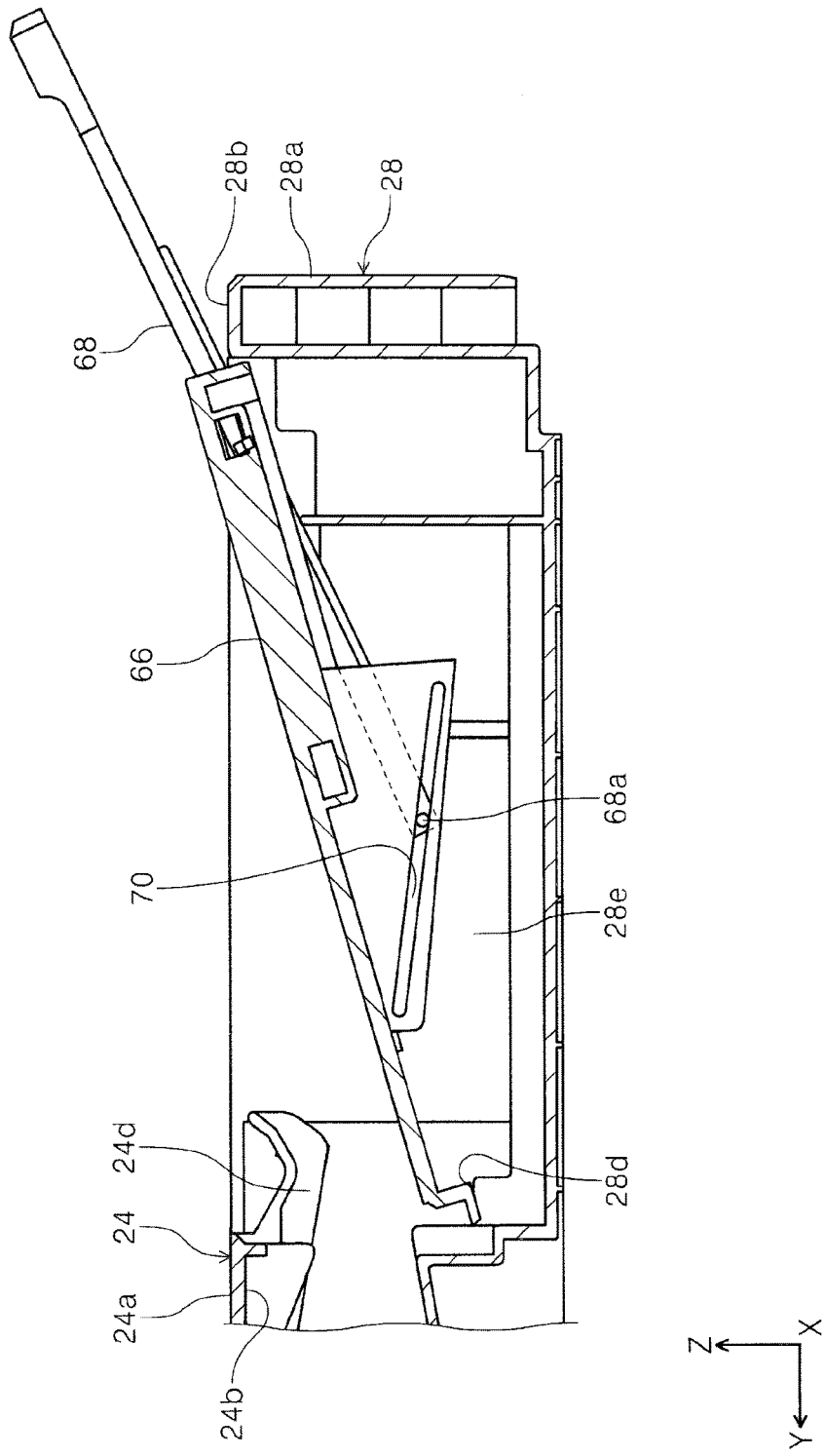
FIG. 20 is a lateral sectional diagram illustrating the feeding state of the document support tray and the sub-tray according to a modification example of the third example.

FIG. 16 is a lateral sectional diagram of the feeding state of the sub-tray in the modification example of the second example, FIG. 17 is a perspective view illustrating a non-feeding state of a document support tray and a sub-tray according to a third example from a bottom side in the apparatus height direction, FIG. 18 is a lateral sectional diagram illustrating the non-feeding state of the document support tray and the sub-tray according to the third example, FIG. 19 is a lateral sectional diagram illustrating the feeding state of the document support tray and the sub-tray according to the third example, and FIG. 20 is a lateral sectional diagram illustrating the feeding state of the document support tray and the sub-tray according to a modification example of the third example.

Figure 21:
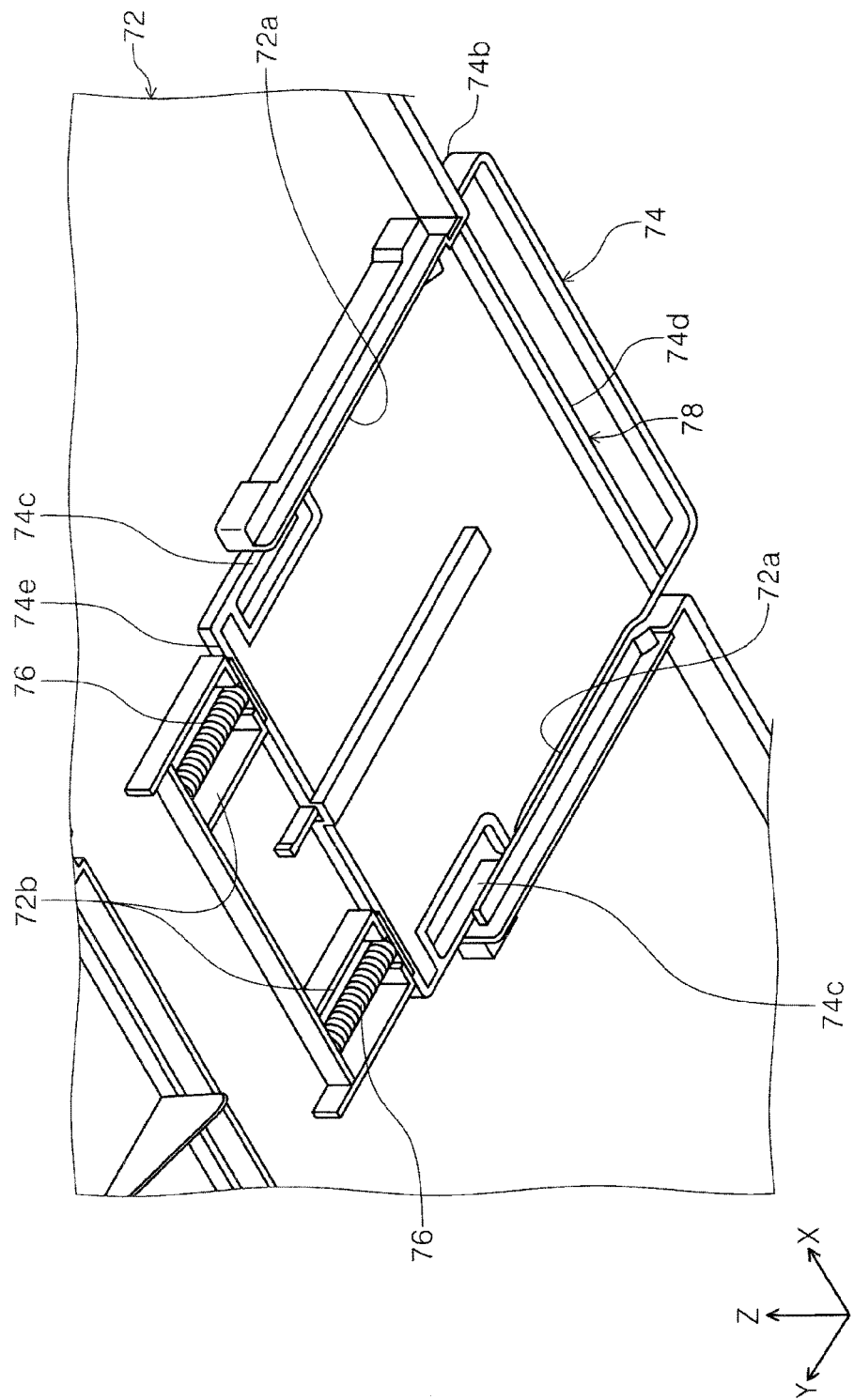
FIG. 21 is a perspective view illustrating a non-feeding state of a document support tray and a sub-tray according to a fourth example from a bottom side in the apparatus height direction.
Figure 22:
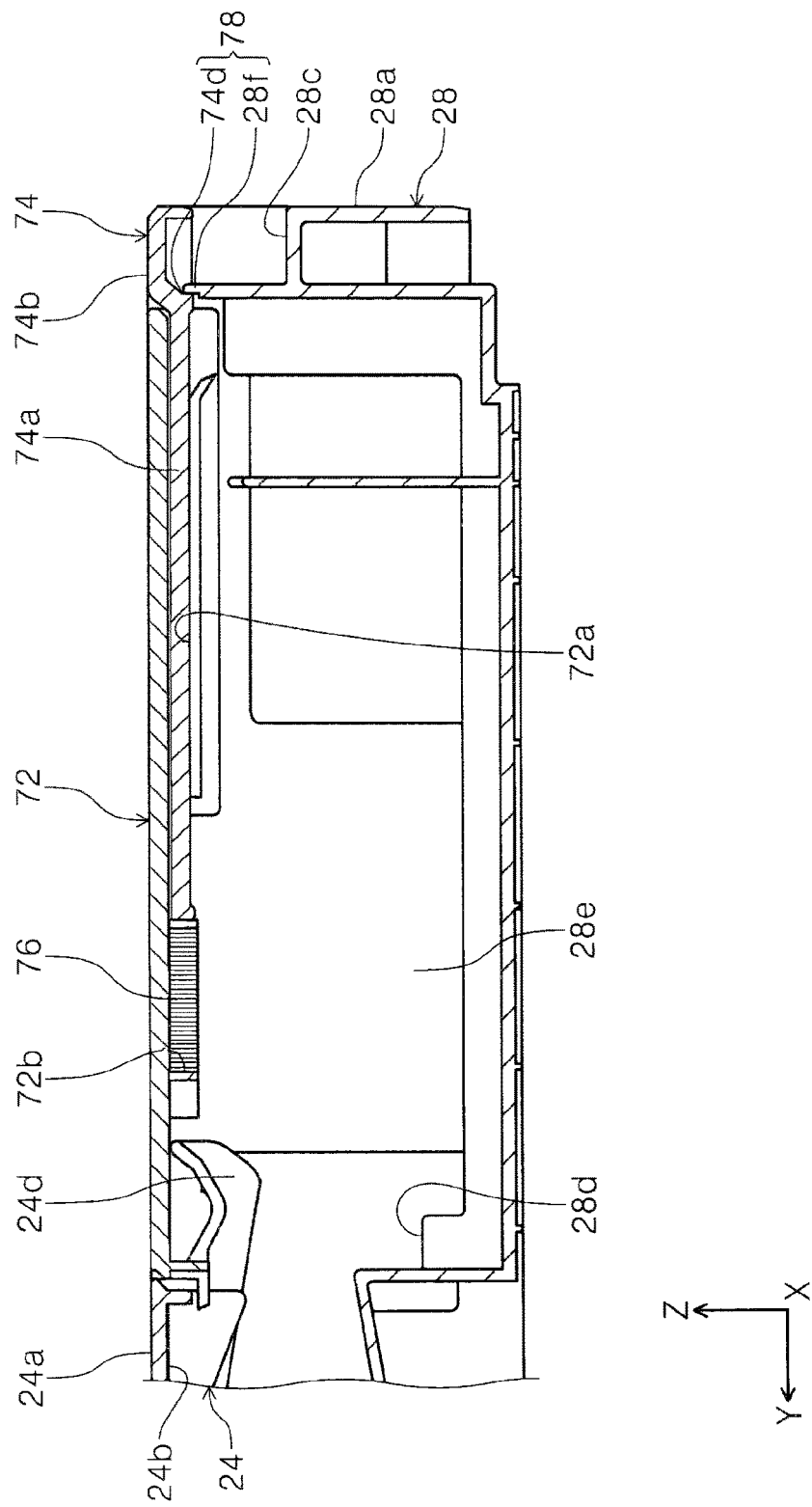
FIG. 22 is a lateral sectional diagram illustrating the non-feeding state of the document support tray and the sub-tray according to the fourth example.
Figure 23:
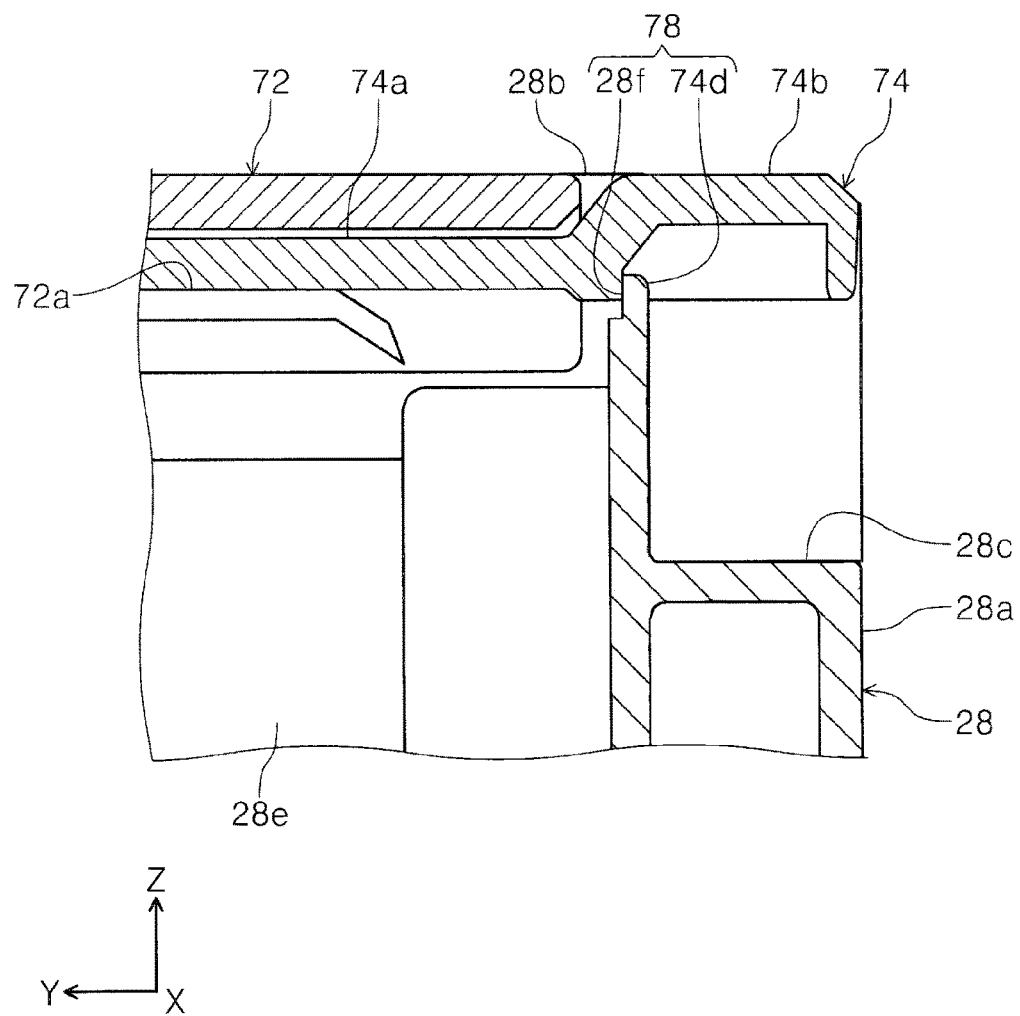
FIG. 23 is a lateral sectional diagram illustrating an engagement state between the sub-tray and an engagement portion of a base frame side according to the fourth example.
Figure 24:
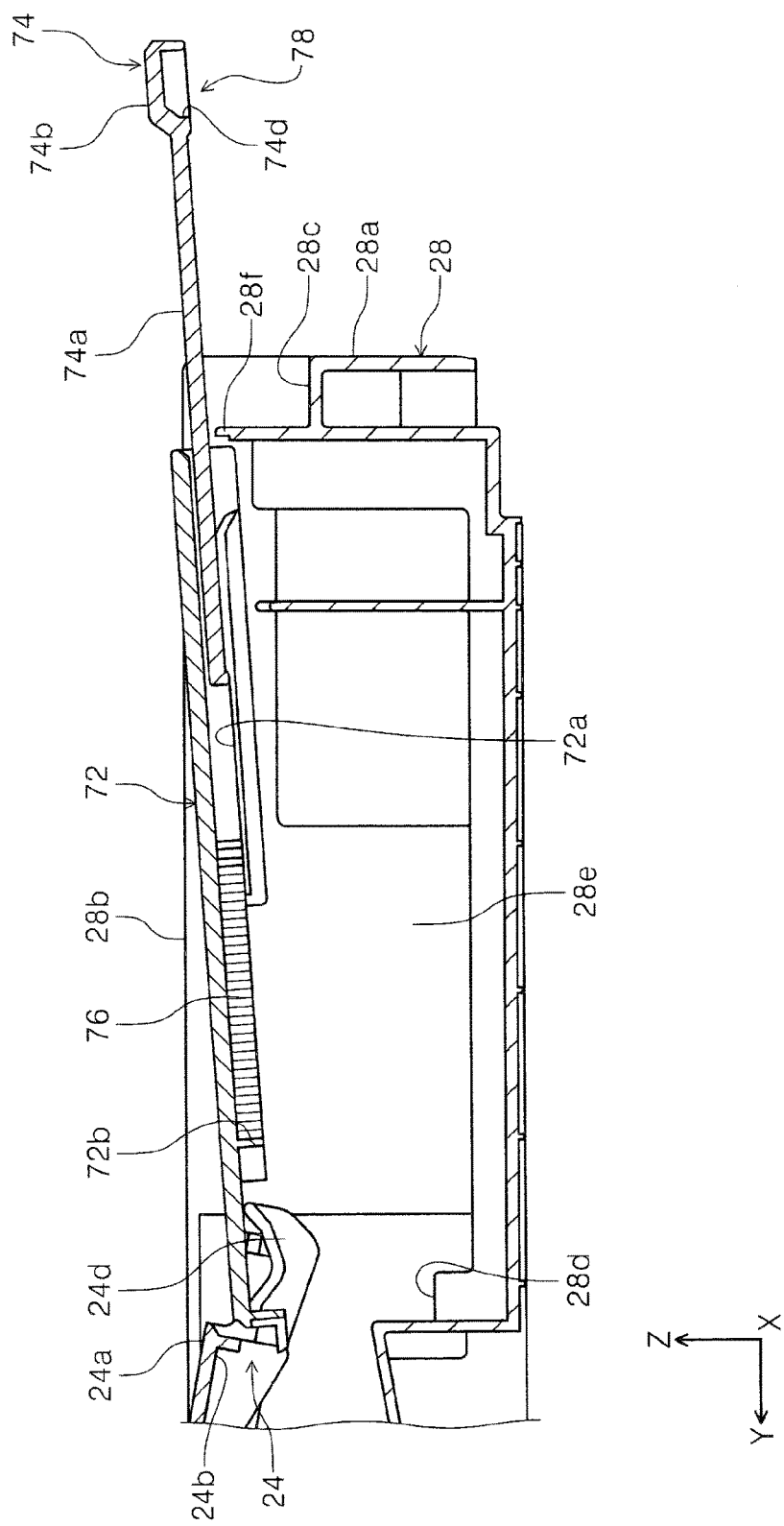
FIG. 24 is a lateral sectional diagram illustrating a state in which the engagement between the document support tray and the sub-tray according to the fourth example is released.
Figure 25:
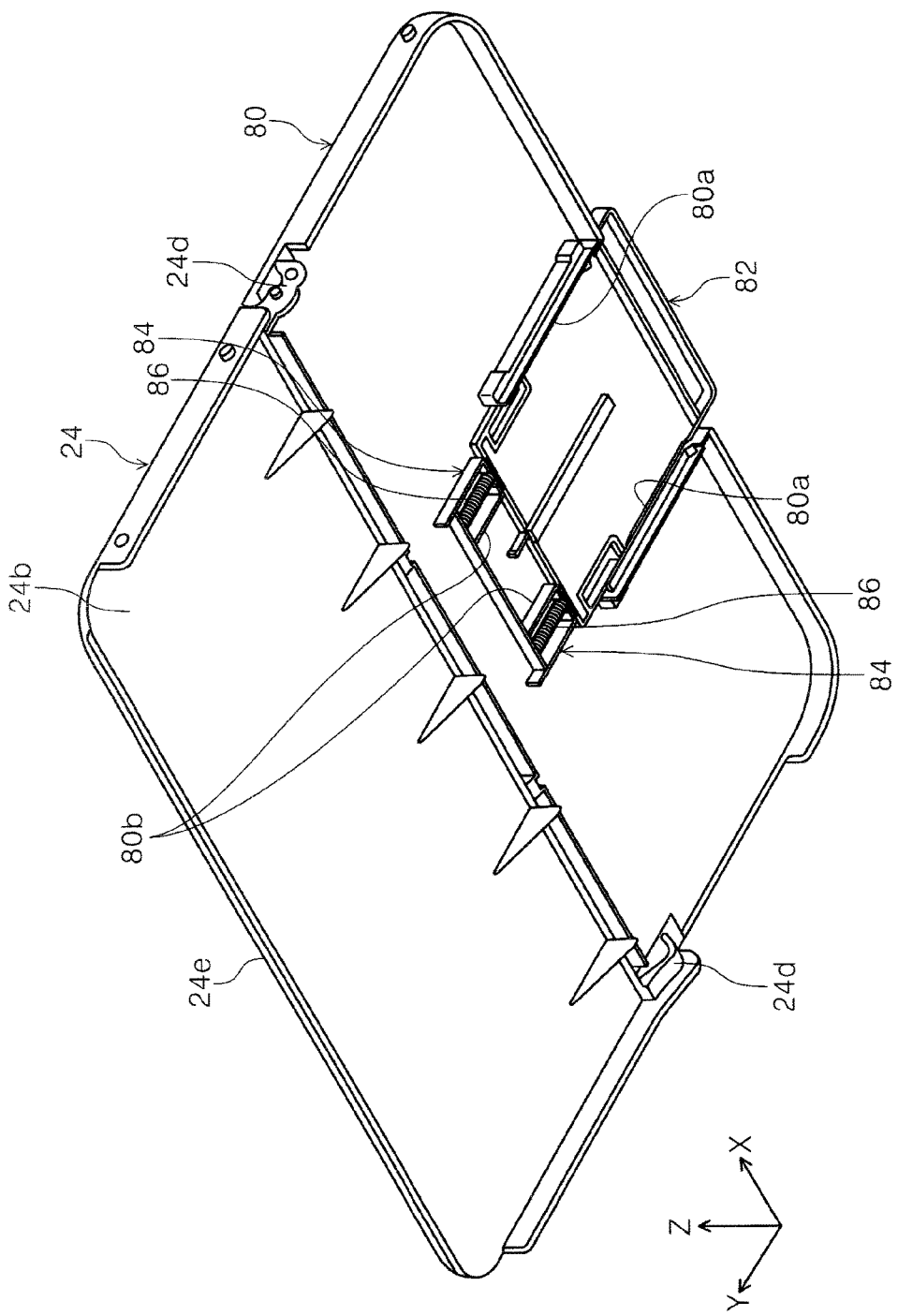
FIG. 25 is a perspective view illustrating a non-feeding state of a document support tray and a sub-tray according to a fifth example from a bottom side in the apparatus height direction.

FIG. 21 is a perspective view illustrating a non-feeding state of a document support tray and a sub-tray according to a fourth example from a bottom side in the apparatus height direction, FIG. 22 is a lateral sectional diagram illustrating the non-feeding state of the document support tray and the sub-tray according to the fourth example, FIG. 23 is a lateral sectional diagram illustrating an engagement state between the sub-tray and an engagement portion of a base frame side according to the fourth example, FIG. 24 is a lateral sectional diagram illustrating a state in which the engagement between the document support tray and the sub-tray according to the fourth example is released, and FIG. 25 is a perspective view illustrating a non-feeding state of a document support tray and a sub-tray according to a fifth example from a bottom side in the apparatus height direction.

Figure 26:
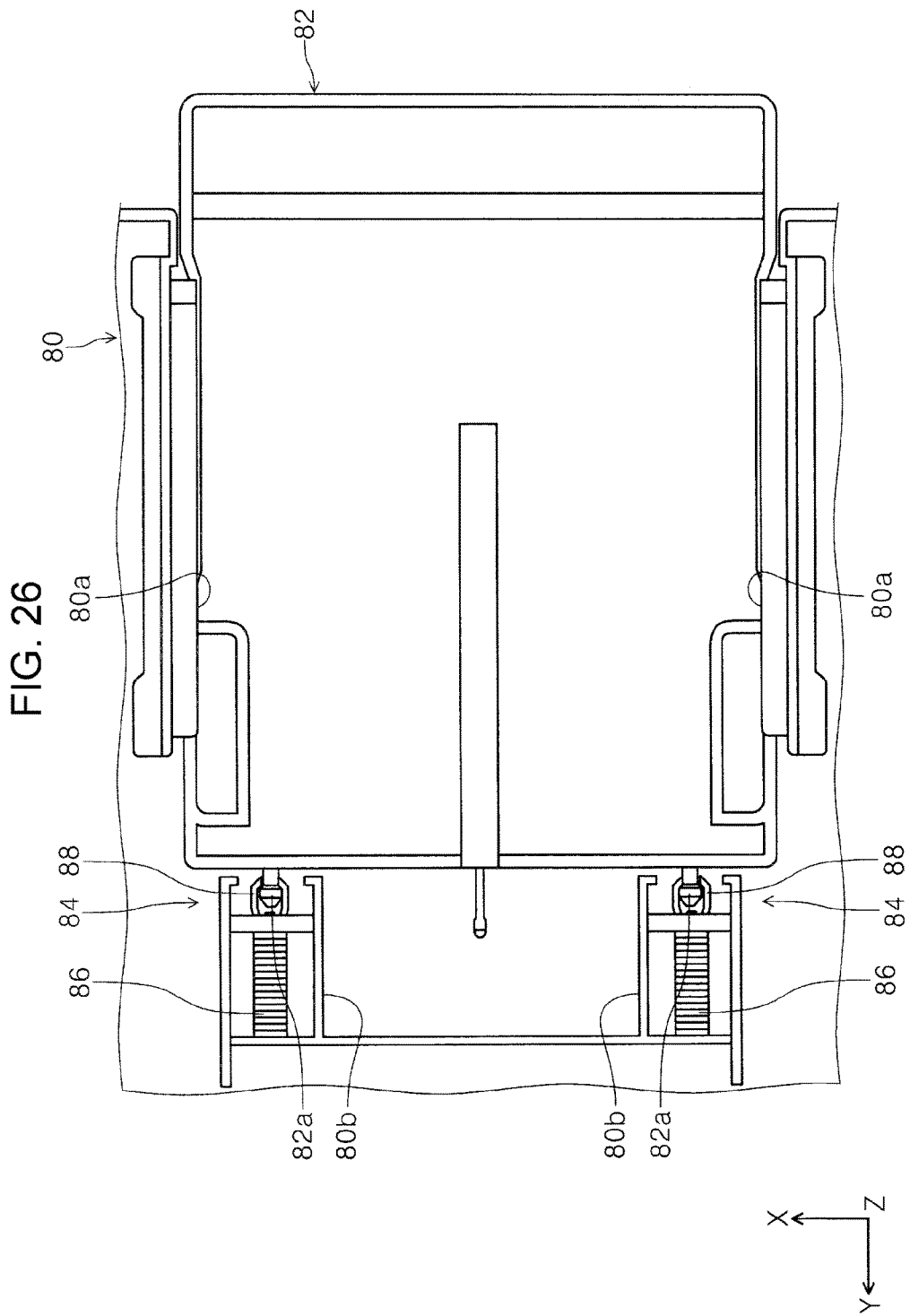
FIG. 26 is a plan view illustrating the non-feeding state of the document support tray and the sub-tray according to the fifth example from the bottom side in the apparatus height direction.
Figure 27:
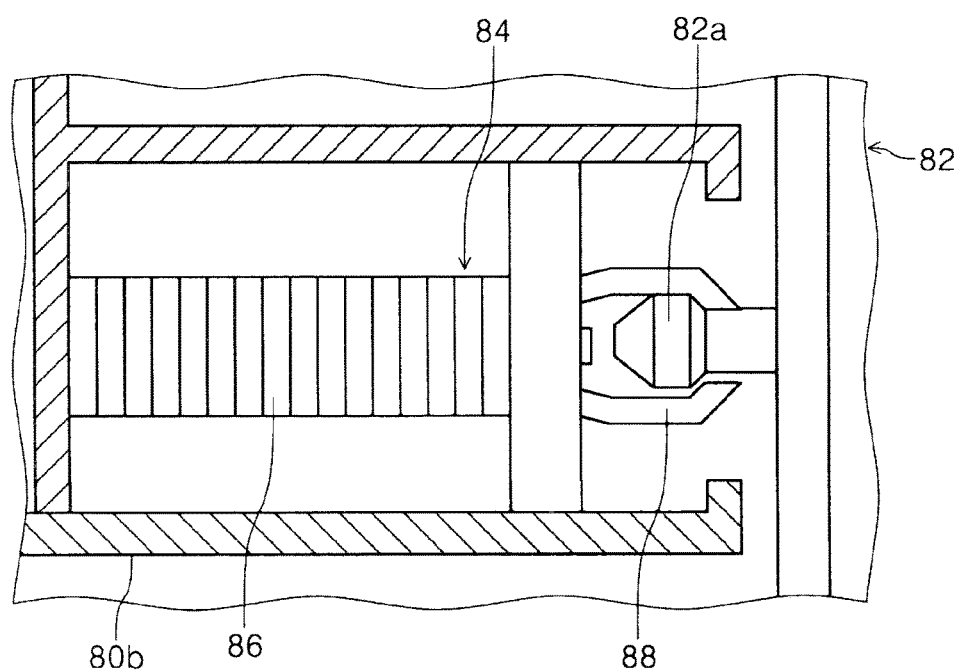
FIG. 27 is a plan view illustrating a push latch mechanism which is disposed between the document support tray and the sub-tray according to the fifth example.
Figure 28:
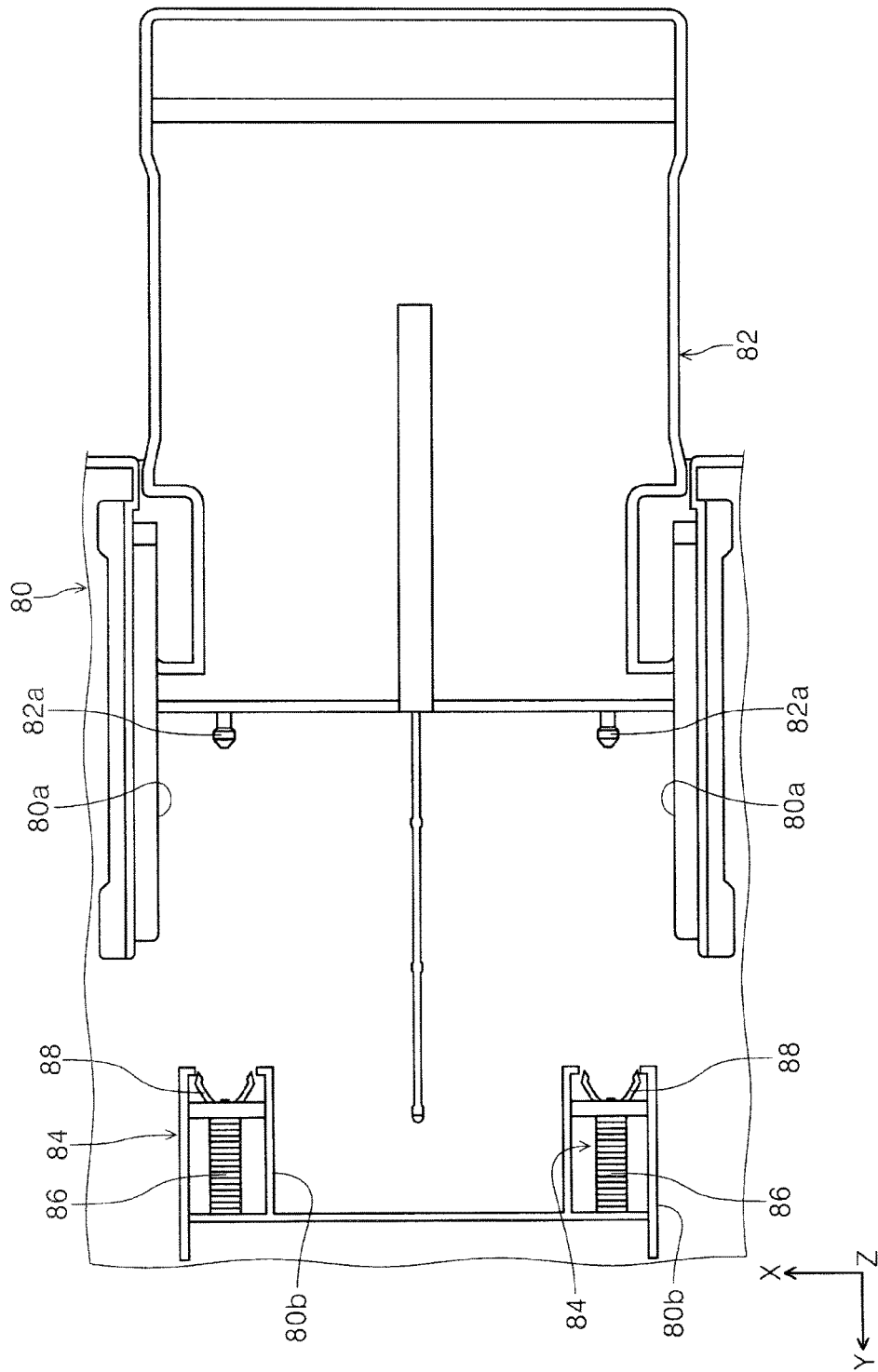
FIG. 28 is a plan view illustrating the feeding state of the document support tray and the sub-tray according to the fifth example from the bottom side in the apparatus height direction.
Figure 29:
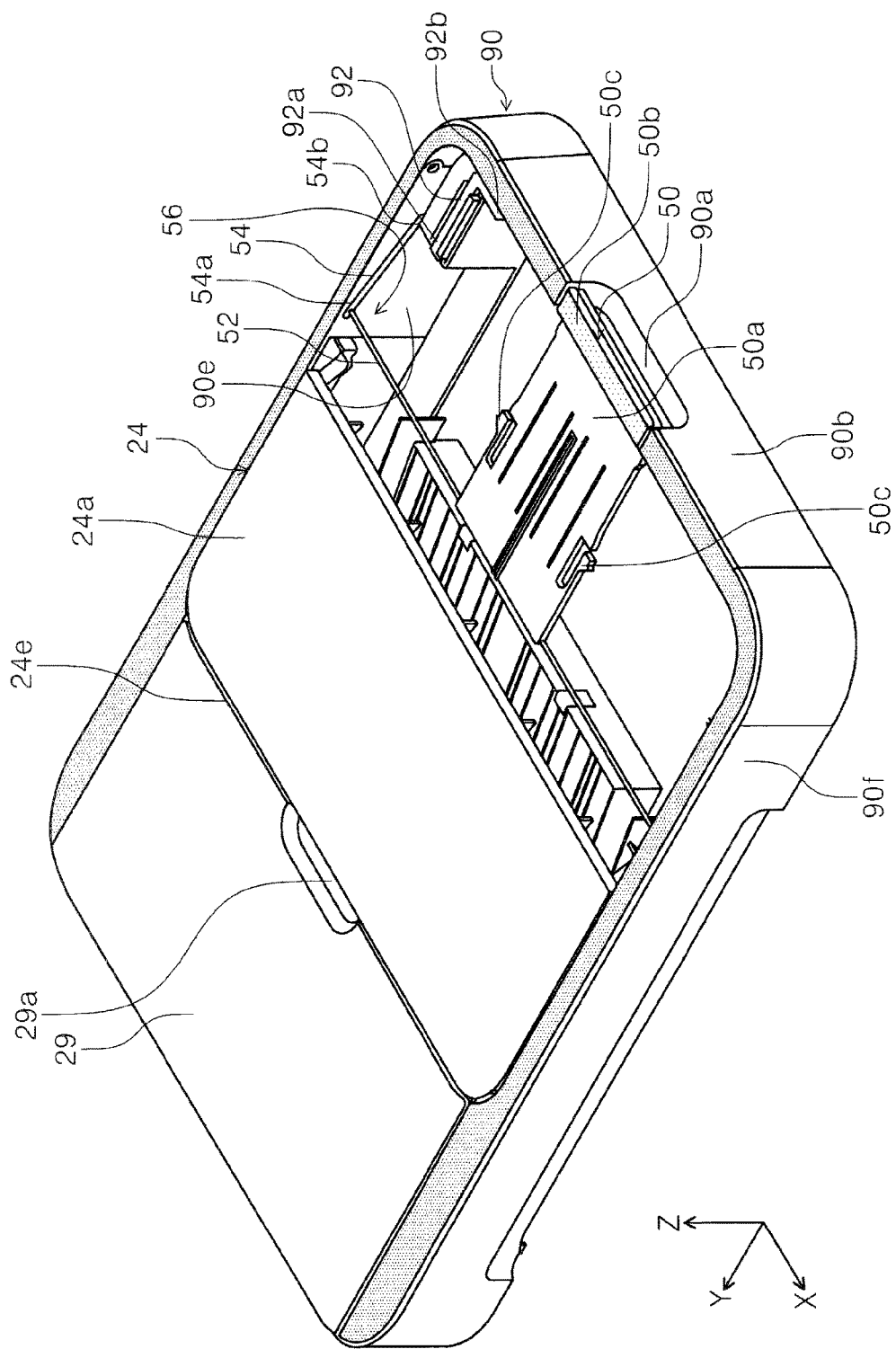
FIG. 29 is a perspective view illustrating a relationship between a sub-tray and an opening-closing portion of a base frame in a non-feeding state according to a sixth example.
Figure 30:
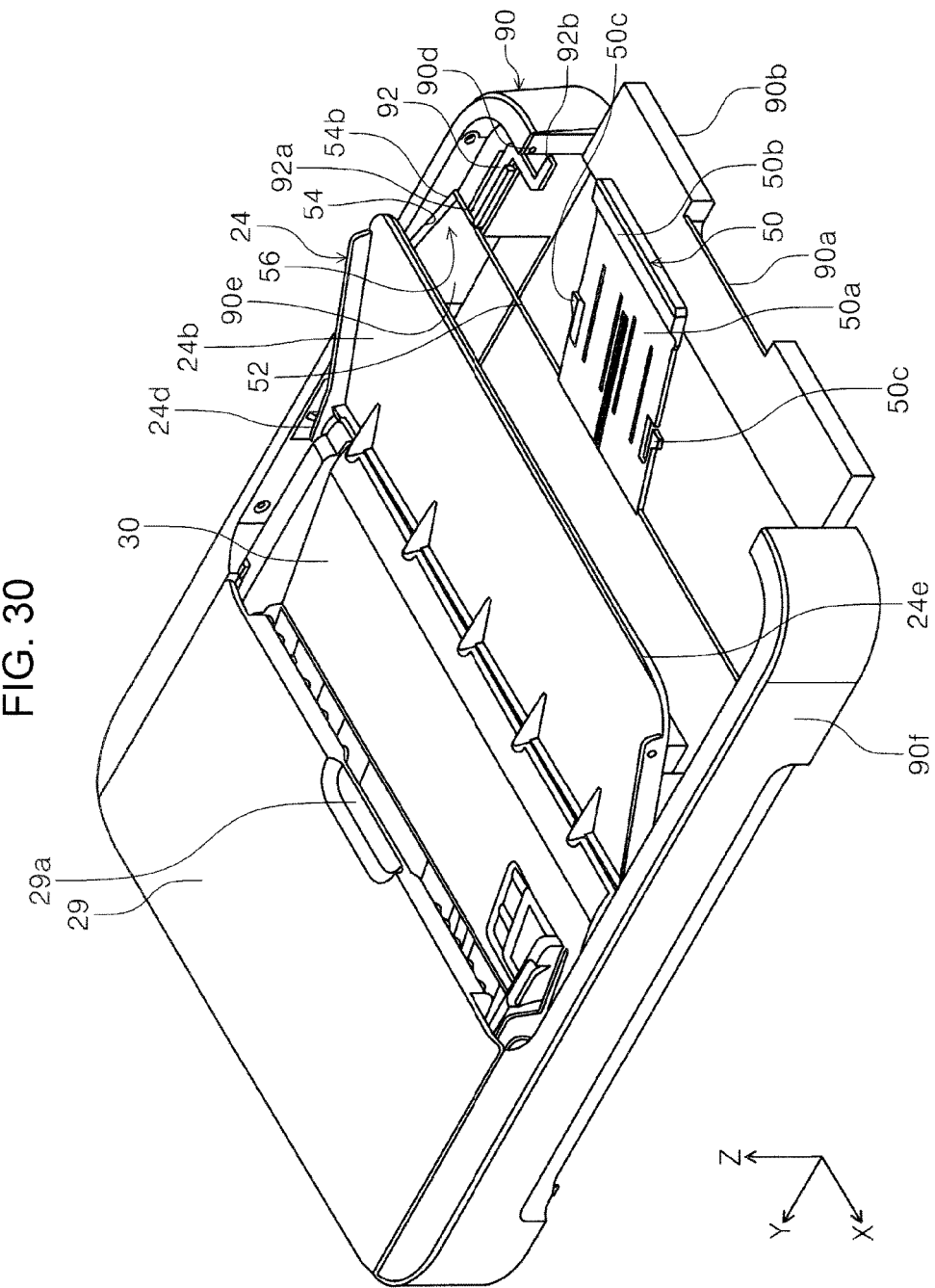
FIG. 30 is a perspective view illustrating the relationship between the sub-tray and the opening-closing portion of the base frame in a feeding state according to the sixth example.

FIG. 26 is a plan view illustrating the non-feeding state of the document support tray and the sub-tray according to the fifth example from the bottom side in the apparatus height direction, FIG. 27 is a plan view illustrating a push latch mechanism which is disposed between the document support tray and the sub-tray according to the fifth example, FIG. 28 is a plan view illustrating the feeding state of the document support tray and the sub-tray according to the fifth example from the bottom side in the apparatus height direction, FIG. 29 is a perspective view illustrating a relationship between a sub-tray and an opening-closing portion of a base frame in a non-feeding state according to a sixth example, and FIG. 30 is a perspective view illustrating the relationship between the sub-tray and the opening-closing portion of the base frame in a feeding state according to the sixth example.

Figure 31:
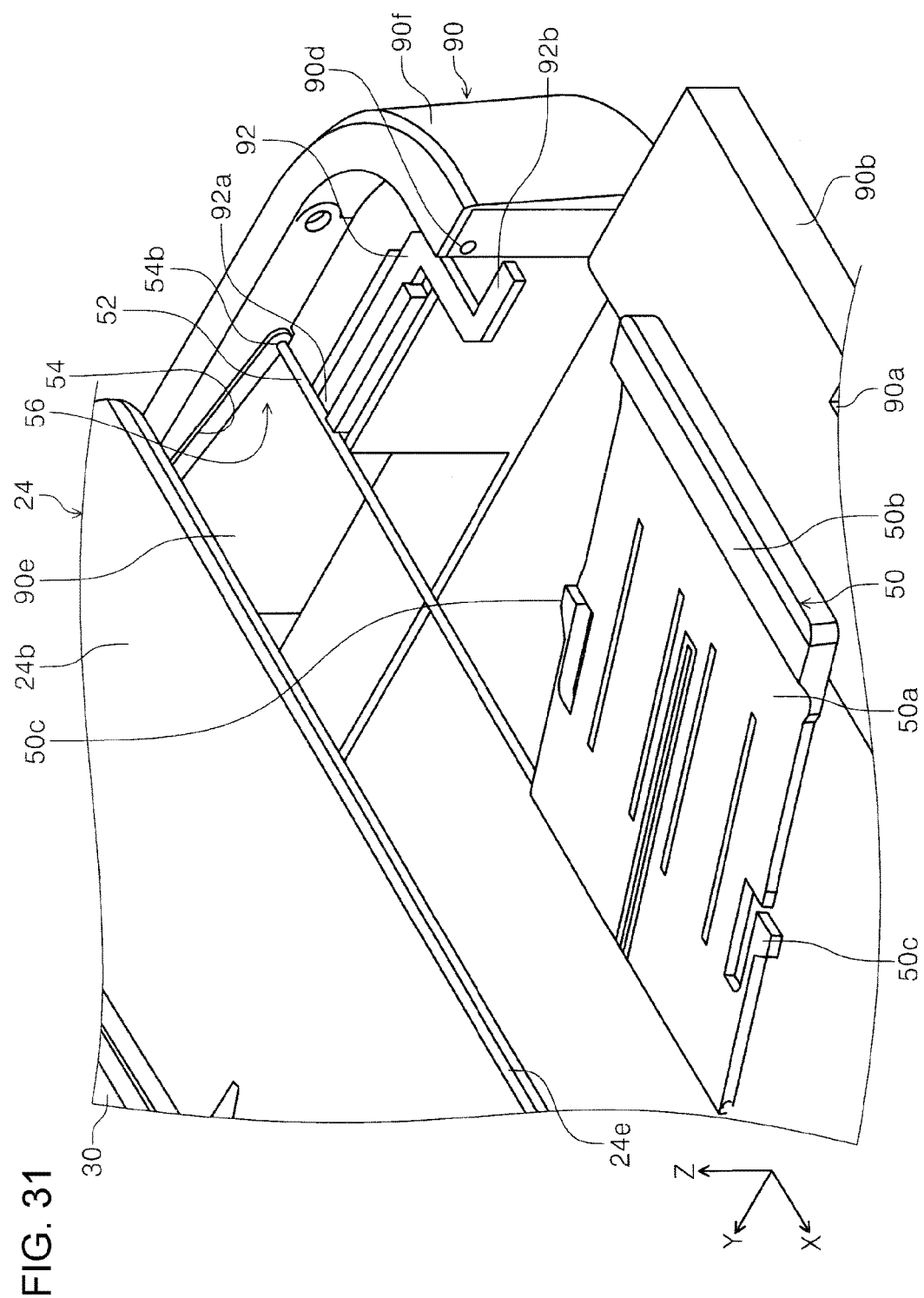
FIG. 31 is a perspective view illustrating the relationship between the sub-tray and the opening-closing portion of the base frame in the feeding state according to the sixth example.
Figure 32:
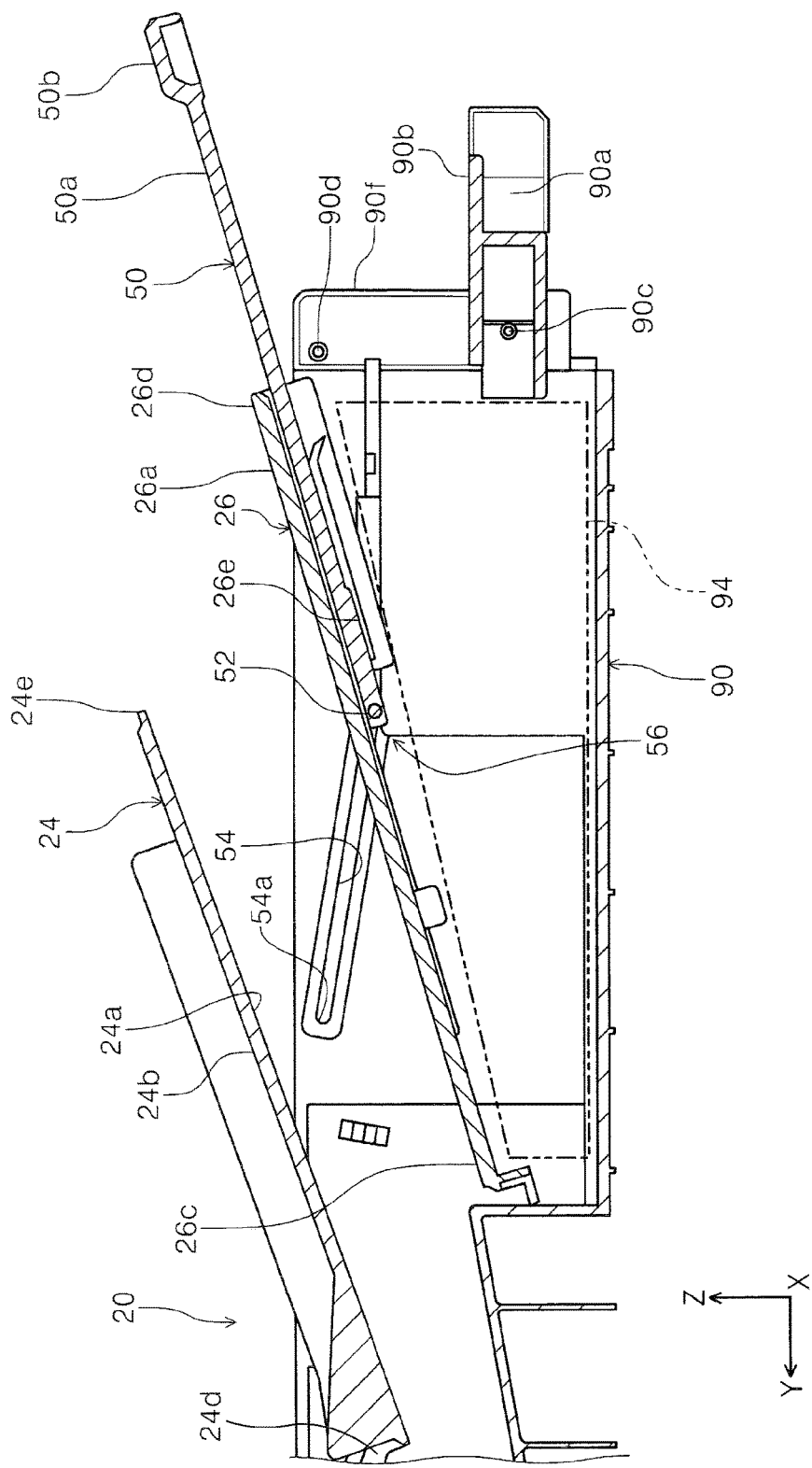
FIG. 32 is a lateral sectional diagram illustrating the feeding state of the document support tray, the sub-tray, and the opening-closing portion of the base frame in the sixth example.
Figure 33:
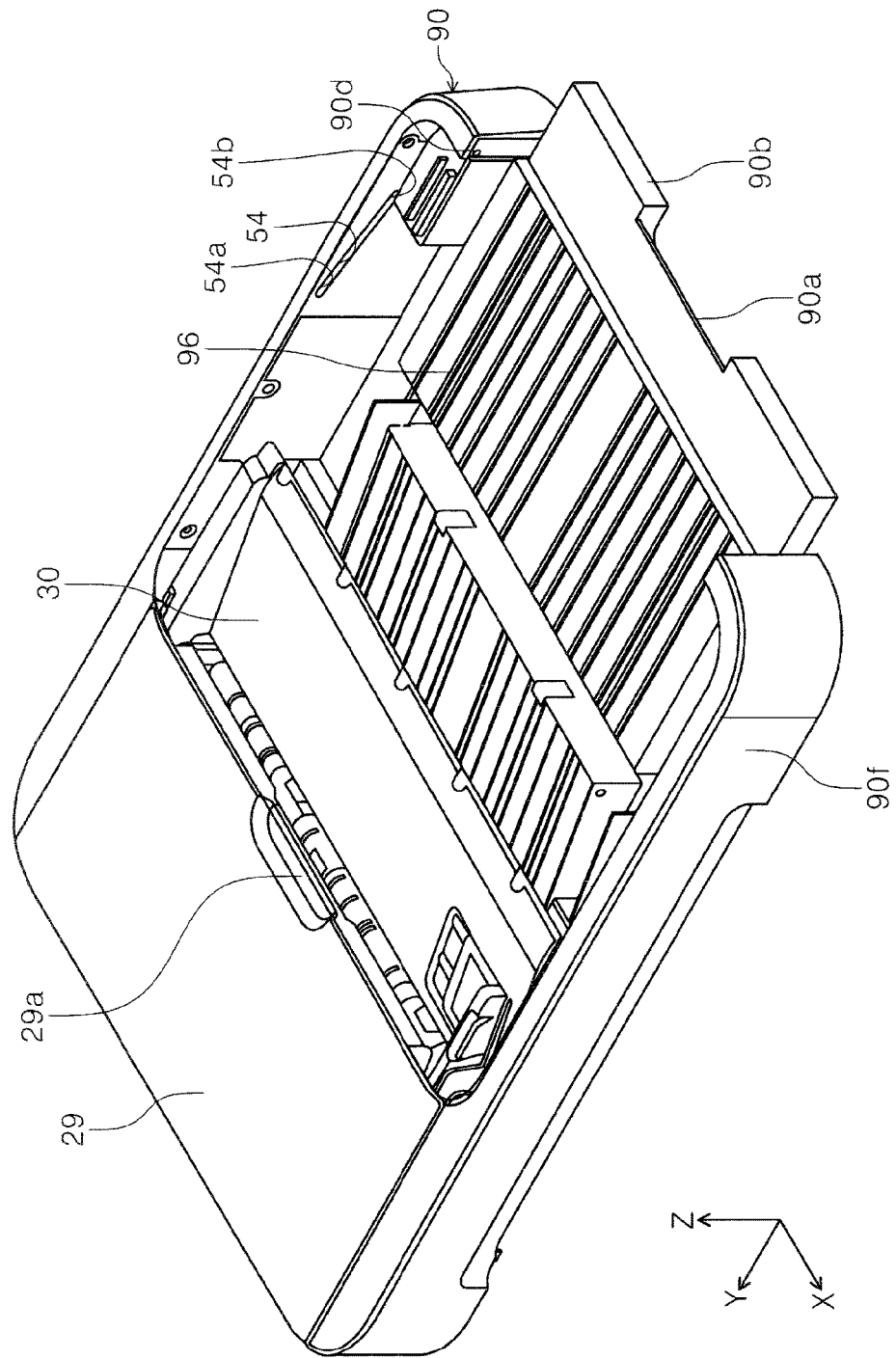
FIG. 33 is a perspective view of the base frame illustrating a modification example of the sixth example.
Figure 34:
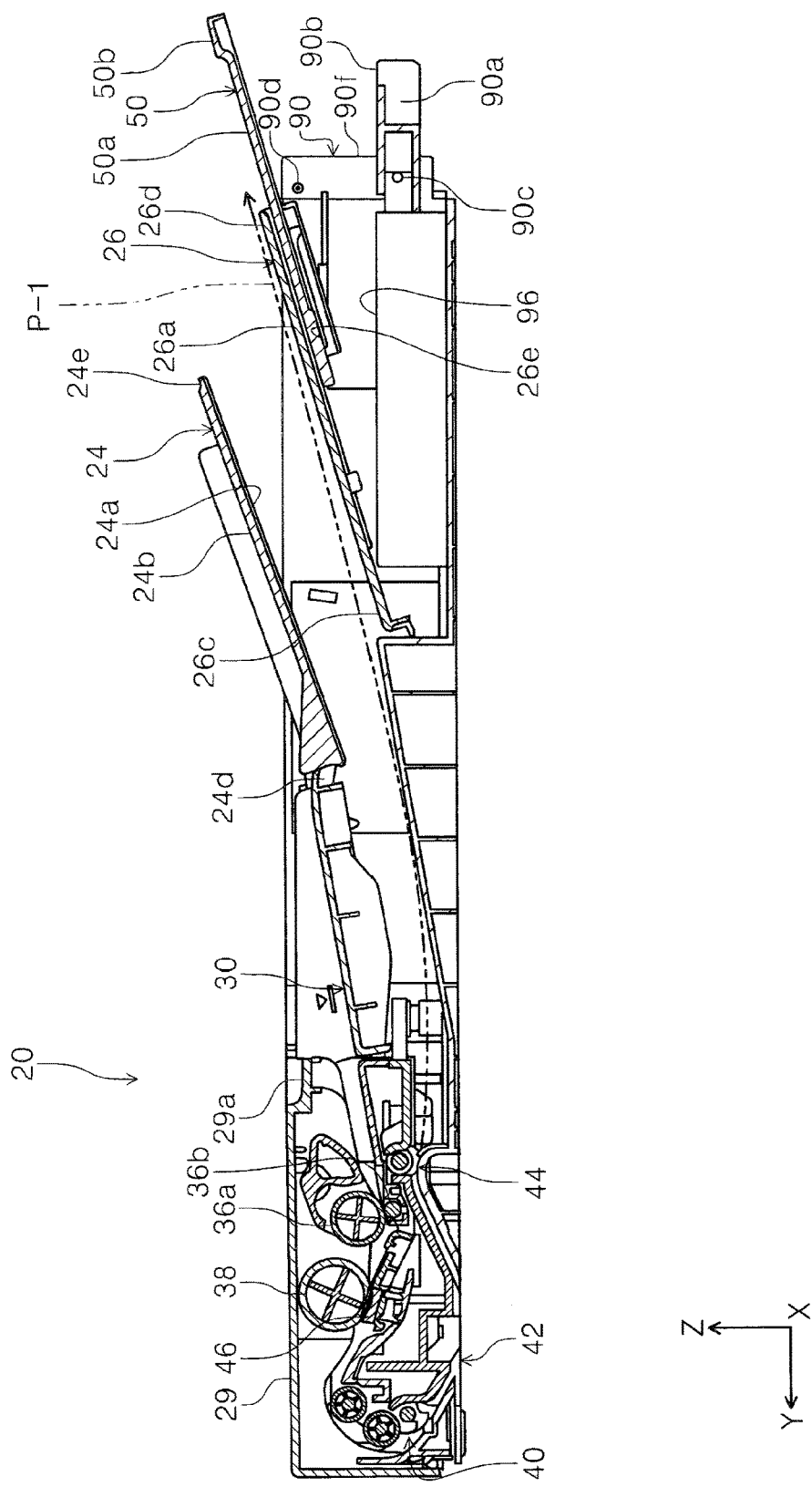
FIG. 34 is a lateral sectional diagram of a case in which the document support tray side is set to a discharge path of a document in the feeding state in the modification example of the sixth example.
Figure 35:
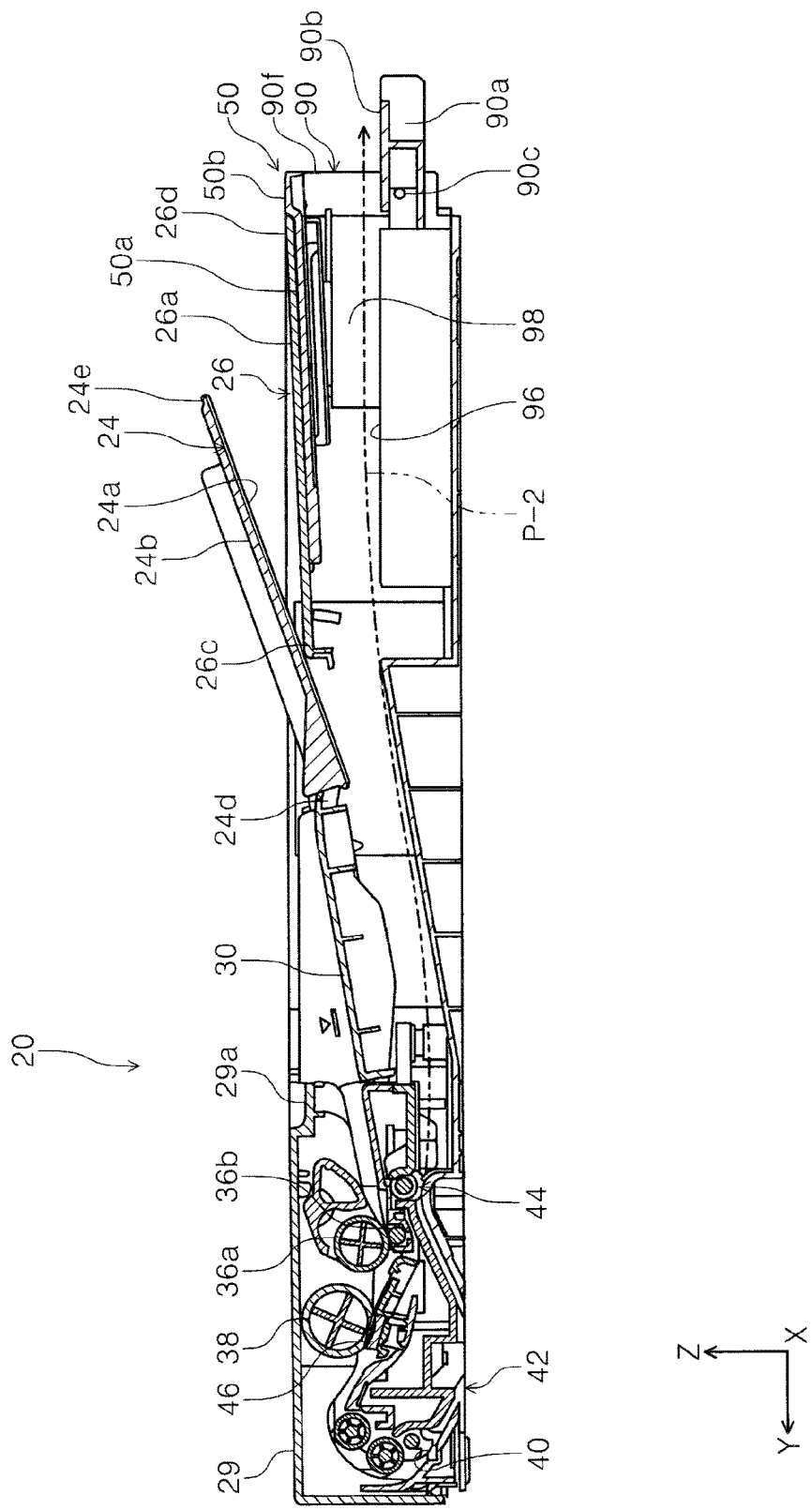
FIG. 35 is a lateral sectional diagram of a case in which the transport path which is positioned on a bottom side of the document support tray in the non-feeding state in the modification example of the sixth example and is provided on the base frame side is set to the discharge path of the document.

FIG. 31 is a perspective view illustrating the relationship between the sub-tray and the opening-closing portion of the base frame in the feeding state according to the sixth example, FIG. 32 is a lateral sectional diagram illustrating the feeding state of the document support tray, the sub-tray, and the opening-closing portion of the base frame in the sixth example, FIG. 33 is a perspective view of the base frame illustrating a modification example of the sixth example, FIG. 34 is a lateral sectional diagram of a case in which the document support tray side is set to a discharge path of a document in the feeding state in the modification example of the sixth example, and FIG. 35 is a lateral sectional diagram of a case in which the transport path which is positioned on a bottom side of the document support tray in the non-feeding state in the modification example of the sixth example and is provided on the base frame side is set to the discharge path of the document.

In the X-Y-Z coordinate system illustrated in the drawings, an X-axis direction indicates a width direction of the document, that is, an apparatus depth direction, a Y-axis direction indicates a transport direction of the document in the transport path inside the image reading apparatus, that is, an apparatus width direction, and a Z-axis direction indicates an apparatus height direction.

First Example

Outline of Printer

A description will be given of the overall configuration of a printer 10 with reference to FIG. 1. The printer 10 is configured as an ink jet printer as an example of a recording apparatus. The printer 10 is configured as a multifunction device which is provided with an apparatus main body 14 and a scanner unit 16 which serves as "the image reading apparatus".

In the present example, the scanner unit 16 is connected to a rear side end portion of the apparatus main body 14 in the apparatus depth direction to be capable of rotational movement, and, although not illustrated, is configured to expose a top portion of the apparatus main body 14 by rotationally moving the scanner unit 16 to the apparatus rear side. The scanner unit 16 is provided with a scanner main body 18 and an automatic document feeder (ADF) unit 20 which serves as "the medium transport device".

The ADF unit 20 is connected to the rear side end portion of the scanner main body 18 in the apparatus depth direction to be capable of rotational movement, and by rotationally moving the ADF unit 20 to the apparatus rear side, it is possible to expose a document placement surface 22 (FIGS. 3 and 4) which is provided on the top portion of the scanner unit 16 and it is possible to set the document on the document placement surface 22. The document placement surface 22 is configured using a transparent flat glass plate, for example. The document which serves as "the medium" in the present example is exemplified by a document such as a photograph or a textual document.

In FIG. 1, a feed tray 24, a document support tray 26 which serves as "the medium support tray", a base frame 28, and an ADF cover 29 which serves as "an opening-closing body" are provided on the top portion of the ADF unit 20. The base frame 28 includes an outer edge forming portion 28a which is formed in a frame shape, for example, and configures the outer edge of the top surface of the ADF unit 20. The feed tray 24, the document support tray 26, and the ADF cover 29 are attached to the base frame 28 to be capable of rotationally moving.

The feed tray 24 and the document support tray 26 are configured to be capable of switching between the non-feeding state illustrated in FIGS. 1 and 3 and the feeding state illustrated in FIGS. 2 and 4. The feed tray 24 is provided with a top surface 24a and a bottom surface 24b. The document support tray 26 is provided with a top surface 26a. A recessed portion 29a is formed in the ADF cover 29. By inserting a finger into the recessed portion 29a, the user is capable of lifting up a +Y-axis direction side end portion 24e of the feed tray 24 and is capable of easily switching from the non-feeding state to the feeding state in the feed tray 24. It is possible to expose at least a portion of a document transport path 32 (described later) by opening the ADF cover 29 and it is possible to simplify the jam processing in the document transport path 32.

In the non-feeding state illustrated in FIGS. 1 and 3, the top surface 24a of the feed tray 24, the top surface 26a of the document support tray 26, a top surface 28b of the outer edge forming portion of the base frame 28 form a top surface 20a of the ADF unit 20. The top surface 24a of the feed tray 24, the top surface 26a of the document support tray 26, and the outer edge forming portion 28a of the base frame 28 take postures running along the X-axis direction and the Y-axis direction which are the horizontal directions, and thus, the top surface 20a of the ADF unit 20 forms a posture which runs along the X-axis direction and the Y-axis direction which are the horizontal directions, that is, forms a flat surface.

Therefore, since the top surface 20a of the ADF unit 20 of the printer 10 is flat, not only is the aesthetic external appearance of the device excellent, but since it is possible to reduce or suppress the occurrence of papers and the like falling from the top surface 20a even if papers and items are temporarily placed on the top surface 20a of the ADF unit 20, it is possible to improve the usability.

In FIGS. 2 and 4, when the feed tray 24 and the document support tray 26 switch to the feeding state, a document support portion 30 is exposed at the top portion of the ADF unit 20. The document support portion 30 supports the document together with the bottom surface 24b of the feed tray 24 which takes the feeding state. The document which is supported by the document support portion 30 and the bottom surface 24b of the feed tray 24 is fed along the document transport path 32.

Regarding Document Transport Path

FIG. 4 describes the document transport path 32. In FIG. 4, a double-dot dashed line to which a reference numeral P is assigned indicates the transport path of the document which is transported along the document transport path 32. In the document transport path 32, a feed roller 36a, a separation roller 38, a transport roller pair 40, and a reading unit 42 and a discharge roller pair 44 which serve as "a reader" are disposed in order on the downstream side of the document support portion 30 in the transport direction.

In the present example, a driven roller 36b is provided at a position facing the feed roller 36a. The driven roller 36b is configured to be capable of being rotationally driven with respect to the feed roller 36a. The driven roller 36b is provided in order to reduce the friction between the feed roller 36a and the opposing surface when the document which is fed by the feed roller 36a runs out and the feed roller 36a continues to rotate. As a result, it is possible to reduce the influence of the transport load on the image which is read.

A separation pad 46 is provided at a position facing the separation roller 38. The separation pad 46 abuts on the separation roller 38. The separation pad 46 is formed by a high friction material, for example. A plurality of documents which is fed by the feed roller 36a is separated by the separation roller 38 and the separation pad 46, and only the document which is in contact with the separation roller 38 is fed to the transport roller pair 40 which is disposed on the downstream side in the document transport direction. The document is curved and inverted in the process of being fed from the separation roller 38 to the transport roller pair 40.

The transport roller pair 40 is provided with a transport roller 40a and a driven roller 40b. The transport roller 40a is configured to receive a motive force from a drive source (not illustrated) to be driven, and the driven roller 40b is configured to be capable of being rotationally driven with respect to the transport roller 40a. The reading unit 42 is provided on the downstream side of the transport roller pair 40. The document which is fed to the reading unit 42 by the transport roller pair 40 is read by an image reading mechanism 48 which is provided at a position facing the document via the document placement surface 22. The document which is read by the image reading mechanism 48 on the document placement surface 22 is transported to the discharge roller pair 44 which is provided on the downstream side of the reading unit 42 in the document transport path 32 and is discharged to the top surface 26a of the document support tray 26 by the discharge roller pair 44.

The discharge roller pair 44 is provided with a discharge roller 44a and a driven roller 44b. The discharge roller 44a is configured to receive a motive force from a drive source (not illustrated) to be driven, and the driven roller 44b is configured to be capable of being rotationally driven with respect to the discharge roller 44a.

Regarding Rotational Movement Operation of Cover Portion and the Like

FIGS. 5 and 6 explain the posture switching of the feed tray 24 and the document support tray 26. In FIG. 6, a rotational movement shaft 24c is formed on the feed tray 24 and the feed tray 24 is configured to be capable of rotational movement using the rotational movement shaft 24c as a rotational movement fulcrum. In FIG. 5, an engagement portion 24d is formed on the −Y-axis direction side of the feed tray 24.

A rotational movement shaft 26b is formed on the document support tray 26 and the document support tray 26 is configured to be capable of rotational movement using the rotational movement shaft 26b as a rotational movement fulcrum. In the present example, the rotational movement shaft 26b is provided at a position close to a −Y-axis direction side end portion 26d between a +Y-axis direction side end portion 26c and the −Y-axis direction side end portion 26d of the document support tray 26 in the Y-axis direction.

When the feed tray 24 is in the non-feeding state (FIG. 5), the engagement portion 24d engages with the +Y-axis direction side end portion 26c of the document support tray 26 to support the document support tray 26 from the bottom side of the document support tray 26.

Next, in FIG. 6, when the feed tray 24 is rotationally moved using the rotational movement shaft 24c as a rotational movement fulcrum, the engagement portion 24d rotationally moves around the rotational movement shaft 24c along a rotational movement track indicated by a double-dot dashed line to which a reference numeral 24d-1 is assigned. Accordingly, the engagement portion 24d is displaced, by rotational movement, from the position at which the document support tray 26 is supported from below the document support tray 26 to a position on the +Y-axis direction side with respect to the rotational movement shaft 24c.

As a result, since the support of the document support tray 26 by the engagement portion 24d is removed, the document support tray 26 rotationally moves in a counterclockwise direction in FIG. 6 under its own weight using the rotational movement shaft 26b as a rotational movement fulcrum. When the +Y-axis direction side end portion 26c of the document support tray 26 is displaced to the −Z-axis direction side, the +Y-axis direction side end portion 26c engages with a support portion 28d of the base frame 28. The support portion 28d supports the document support tray 26 in an inclined posture (the feeding state). Accordingly, the document support tray 26 switches from the non-feeding state (the horizontal posture) to the feeding state (the inclined posture). In FIG. 6, a dot dashed line to which a reference numeral 26c-1 is assigned indicates the rotational movement track of the +Y-axis direction side end portion 26c of the document support tray 26.

In FIG. 6, when the feed tray 24 rotationally moves in the clockwise direction using the rotational movement shaft 24c as a rotational movement fulcrum, the top surface 24a transitions to the bottom side with respect to a cladding surface, the bottom surface 24b transitions to the top side with respect to the cladding surface, and the bottom surface 24b functions as a support surface of the document.

Regarding Sub-tray

Next, a description will be given of a sub-tray 50 mainly with reference to FIGS. 8 to 10. In FIGS. 8 and 9, on the −Y-axis direction side end portion 26d on the document support tray 26, the sub-tray 50 is configured to be capable of switching between a state in which the sub-tray 50 is stored in the document support tray 26 (FIG. 8) and a state in which the sub-tray 50 is pulled out from the document support tray 26 (FIG. 9). As illustrated in FIG. 10, the sub-tray 50 is provided with a flat support portion 50a, a convex portion 50b, and biasing portions 50c. The support portion 50a is capable of supporting the document, the convex portion 50b protrudes to the +Z-axis direction side further than the support portion 50a on the −Y-axis direction side end portion of the support portion 50a, and the biasing portions 50c are provided on both sides in the X-axis direction on the +Y-axis direction side end portion of the support portion 50a.

In the present example, the biasing portions 50c engage with a groove portion 26e (FIG. 4) which is provided on the bottom surface side of the document support tray 26 and are configured to be capable of sliding to move relative to the groove portion 26e. The biasing portions 50c bias the groove portion 26e of the document support tray 26 in the X-axis direction. Accordingly, a frictional force is generated between the groove portion 26e and the sub-tray 50 and the posture of the sub-tray 50 with respect to the document support tray 26 is maintained by the frictional force.

In FIGS. 3 and 7, in a state in which the sub-tray 50 is stored in the document support tray 26, the sub-tray 50 is positioned at a position at which the sub-tray 50 is stored on the bottom side of the document support tray 26. Here, in FIG. 8, a cutout portion 28c is formed in the outer edge forming portion 28a of the base frame 28 at a position corresponding to the position at which the sub-tray 50 of the document support tray 26 is provided. When the sub-tray 50 is positioned at the storage position of the document support tray 26 and the document support tray 26 is in the non-feeding state (the state of FIG. 8), a state is assumed in which the convex portion 50b of the sub-tray 50 fills the cutout portion 28c.

Here, as illustrated in FIG. 8, in a state in which the sub-tray 50 is stored in the document support tray 26, the convex portion 50b protrudes from the −Y-axis direction side end portion 26d of the document support tray 26, and when the ADF unit 20 is viewed from above, the convex portion 50b is exposed without being hidden by the bottom side of the document support tray 26. In the present example, the convex portion 50b functions as a manipulating portion of the sub-tray 50.

In the present example, in a state in which the sub-tray 50 is stored in the document support tray 26 in the non-feeding state, the convex portion 50b is set to be substantially the same height as the top surface 28b of the outer edge forming portion 28a in the Z-axis direction. In this state, the convex portion 50b configures a portion of the top surface 20a of the ADF unit 20 as well as the top surface 28b of the outer edge forming portion 28a. The expression "substantially the same height" does not mean that the height matches completely in a strict sense and the meaning of the expression includes deviation within a range at which, even if there is a little deviation in the heights of the convex portion 50b and the top surface 28b of the outer edge forming portion 28a, an overall flat shape of the top surface 20a of the ADF unit 20 is maintained.

In FIG. 9, it is possible to pull out the sub-tray 50 from the bottom side of the document support tray 26 in the non-feeding state to a pulled-out position at which the sub-tray 50 is positioned on the −Y-axis direction side with respect to the −Y-axis direction side end portion 26d of the document support tray 26. In FIGS. 8 and 9, in a state in which the document support tray 26 takes a horizontal posture (the non-feeding state), the sub-tray 50 slides to move in the −Y-axis direction which is a direction that is parallel to the top surface 20a of the ADF unit 20. As a result, even if the sub-tray 50 is caused to slide to move between the storage position and the pulled-out position, the height level of the convex portion 50b in the Z-axis direction is maintained.

When the sub-tray 50 is pulled out from the document support tray 26 in the non-feeding state to the pulled-out position, the convex portion 50b also moves in the −Y-axis direction from the position at which the convex portion 50b fills the cutout portion 28c in a state in which the height level of the convex portion 50b is maintained in the Z-axis direction. As a result, even if the sub-tray 50 is at either position of the storage position and the pulled-out position, the flat shape of the top surface 20a of the ADF unit 20 is maintained and it is possible to stabilize a document or the like on the top surface 20a.

Since the convex portion 50b moves in the −Y-axis direction in a state in which the height level of the convex portion 50b is maintained, even if the size of the document or the like is larger than the top surface 20a in the Y-axis direction, the convex portion 50b is capable of supporting the portion which overhangs from the top surface 20a, and it is possible to place a document or the like which is larger than the top surface 20a in the Y-axis direction on the ADF unit 20.

In FIGS. 6 to 9, the sliding movement of the sub-tray 50 from the storage position to the pulled-out position or the sliding movement of the sub-tray 50 from the pulled-out position to the storage position is configured to be possible regardless of whether the document support tray 26 is in the feeding state or the non-feeding state.

In the present example, as illustrated in FIG. 6, by pulling out the sub-tray 50 from the document support tray 26 in the feeding state (the inclined posture), it is possible to increase the placement length of the document along the document transport direction and it is possible to place even a long document. When a plurality of sheets of the document is placed on the document support tray 26 and the support portion 50a, the convex portion 50b on the sub-tray 50 in the inclined posture functions as a stopper which stops the transported document, and thus, it is possible to improve the stacking properties.

In FIGS. 8 and 9, the top surface 28b and the convex portion 50b of the outer edge forming portion 28a are configured as embossed surfaces provided with a plurality of protrusions. Accordingly, in a case in which a document or the like is placed on the top surface 20a of the ADF unit 20, since the embossed surface exhibits a slipping suppression effect, it is possible to stably place the document on the top surface 20a. In the drawings other than FIGS. 8 and 9, the depiction of the embossing is omitted. In the present example, the embossed surfaces are configured by a plurality of protrusions. However, the embossed surface may be configured by a plurality of recessed shapes or may be configured by a plurality of protrusions and recessed shapes.

In the present example, when the document support tray 26 is in the non-feeding state, since the sub-tray 50 is stored at a posture going along the Y-axis direction (the horizontal direction) at the storage position on the bottom side of the document support tray 26, it is possible to widen the bottom portion space of the document support tray 26 and it is possible to widen the movable region of the document support tray 26. Accordingly, when the document support tray 26 is switched from the non-feeding state to the feeding state, the angular adjustment of the document support tray 26 becomes easy and it is possible to improve the stacking properties of the document which is discharged.

In the present example, since the convex portion 50b of the sub-tray 50 also serves as the manipulating portion of the sub-tray 50 in addition to configuring a portion of the top surface 20a of the ADF unit 20, it is possible to achieve favorable manipulability of the sub-tray 50 by the user while maintaining the flat shape of the top surface 20a of the ADF unit 20.

Second Example

Next, a description will be given of the second example with reference to FIGS. 11 to 14. The second example differs from the first example in that a link mechanism 56 is provided between the sub-tray 50 and the base frame 28. In FIGS. 13 and 14 the depiction of the feed tray 24 and the document support tray 26 is omitted.

In FIG. 13, a link shaft 52 which extends in the X-axis direction is provided on the +Y-axis direction side end portion of the sub-tray 50. A link groove 54 is formed in each of both side walls 28e in the X-axis direction in the base frame 28. As illustrated in FIG. 11, the link groove 54 in the present example extends in the −Y-axis direction and is inclined downward in the −Z-axis direction to form an angle θ with respect to the Y-axis direction (the horizontal direction). Each of the link grooves 54 engages with a corresponding top end portion 54a in the X-axis direction of the link shaft 52. In the present example, the link shaft 52 and the link grooves 54 configure the link mechanism 56.

Specifically, in FIG. 13, end portions 52a of the link shaft 52 engage with the top end portions 54a of the link groove 54 in a state in which the sub-tray 50 is positioned at the storage position. In FIG. 14, when the sub-tray 50 slides to move from the storage position to the pulled-out position, the end portions 52a of the link shaft 52 move along the link groove 54 from the top end portions 54a to bottom end portions 54b of the link groove 54 and engage with the bottom end portions 54b.

In FIG. 11, when the feed tray 24 and the document support tray 26 are in the non-feeding state, the sub-tray 50 is stored on the bottom side of the document support tray 26. Here, when the feed tray 24 is rotationally moved in the clockwise direction in FIG. 11 from the non-feeding state to the feeding state, the engagement portion 24d rotationally moves in the clockwise direction around the rotational movement shaft 24c. In the present example, a length between the rotational movement shaft 26b and the +Y-axis direction side end portion 26c of the document support tray 26 is set to L1. In the present example, the rotational movement shaft 26b is positioned close to the −Y-axis direction side end portion 26d.

When the engagement portion 24d rotationally moves around the rotational movement shaft 24c in the clockwise direction, as illustrated in FIG. 12, since a self weight F1 acts on the +Y-axis direction side end portion 26c of the document support tray 26, the rotational movement shaft 26b rotationally moves in the counterclockwise direction using the rotational movement shaft 26b as a fulcrum.

Again, in FIG. 11, the link shaft 52 is provided at a position which is a distance L2 away from the rotational movement shaft 26b of the document support tray 26. When the +Y-axis direction side end portion 26c of the document support tray 26 is to rotationally move in the counterclockwise direction FIG. 11 using the rotational movement shaft 26b as a fulcrum, the document support tray 26 pushes the sub-tray 50 in the −Z-axis direction with a force F2.

Accordingly, the link shaft 52 is also pushed in the −Z-axis direction with the force F2. As a result, since the link shaft 52 is pushed in the direction of the link groove 54 with a force Fa, the link shaft 52 starts moving along the link groove 54 from the top end portion 54a toward the bottom end portion 54b. The force Fa which is necessary for the link shaft 52 to start moving along the link groove 54 can be obtained from the equation $Fa = (L1/L2) \times F1 \times \sin\theta$.

As illustrated in FIG. 12, when the +Y-axis direction side end portion 26c of the document support tray 26 engages with the support portion 28d of the base frame 28 and is supported, the document support tray 26 switches from the non-feeding state to the feeding state. In this state, the link shaft 52 moves to the bottom end portions 54b of the link grooves 54 and engages with the bottom end portions 54b. In this state, the distance between the rotational movement shaft 26b of the document support tray 26 and the link shaft 52 in the Y-axis direction is L3.

The sub-tray 50 takes a state of being pulled out to the −Y-axis direction side from the document support tray 26 together with the movement of the link shaft 52. For example, the sub-tray 50 is pulled out to a position at which the distance from the −Y-axis direction side end portion of the base frame 28 to the −Y-axis direction side end portion of the convex portion 50b becomes L4. In this state, since a force Fb acts on the link shaft 52 in the direction of the link grooves 54, the position of the sub-tray 50 with respect to the document support tray 26 is maintained by the force Fb.

To summarize the description, when the feed tray 24 is to be switched from the non-feeding state to the feeding state, the document support tray 26 also switches from the non-feeding state to the feeding state. The sub-tray 50 is also pulled out from the storage position to the pulled-out position by the link mechanism 56 in accordance with the switching of the document support tray 26 from the non-feeding state to the feeding state. In the present example, since even if the user forgets to pull out the sub-tray 50, the sub-tray 50 is pulled out to the pulled-out position in accordance with the feeding state of the document support tray 26, it is possible to prevent the document from falling from the ADF unit 20 using the pulled out sub-tray 50.

In FIG. 12, when the feed tray 24 in the feeding state is to be rotationally moved in the counterclockwise direction using the rotational movement shaft 24*c* as a fulcrum to switch to the non-feeding state, together with the rotational movement of the feed tray 24, the engagement portion 24*d* engages with the +Y-axis direction side end portion 26*c* of the document support tray 26 to lift up the +Y-axis direction side end portion 26*c* from the bottom side. Accordingly, the document support tray 26 also rotationally moves in the clockwise direction using the rotational movement shaft 26*b* as a fulcrum.

As a result, the sub-tray 50 is moved from the pulled-out position to the storage position by the link mechanism 56. Therefore, the sub-tray 50 is stored inside the document support tray 26 in accordance with the switching of the document support tray 26 from the feeding state to the non-feeding state. Accordingly, since when the ADF unit 20 is in the non-usage state, it is possible to prevent the sub-tray 50 from remaining in the pulled out state, it is possible to prevent the sub-tray 50 from being unintentionally damaged.

Modification Example of Second Example (1) Rollers or the like may be provided on the top end portions 54*a* in the X-axis direction of the link shaft 52. In this configuration, it is possible to reduce the frictional force between the link shaft 52 and the link grooves 54 and it is possible to perform the movement of the sub-tray 50 with a smaller force. The configuration in which rollers or the like are provided on the top end portions 54*a* of the link shaft 52 can be applied not only to the second example but also the following third example and the sixth example.

(2) As illustrated in FIGS. 15 and 16, the sub-tray may be configured from a plurality of members. In this modification example, a sub-tray 58 is provided with a first tray 60, a second tray 62, and a second tray biasing unit 64. In the first tray 60, the link shaft 52 is attached to the +Y-axis direction side end portion. Biasing portions 60*a* are provided on both side portions of the first tray 60 in the X-axis direction. The biasing portions 60*a* are fitted into the groove portion 26*e* of the document support tray 26 and bias the document support tray 26.

The second tray 62 is provided with a flat support portion 62*a* which is capable of supporting the document and a convex portion 62*b* which is provided on the −Y-axis direction side end portion. The second tray 62 is configured to be capable of sliding to move with respect to the first tray 60. The second tray biasing unit 64 is provided between the first tray 60 and the second tray 62. The second tray biasing unit 64 biases the second tray 62 in a direction separating from the first tray 60. In the present example, the second tray biasing unit 64 is configured as a coil spring, for example.

Here, the sub-tray 58 is also to move from the storage position to the pulled-out position together with the switching of the document support tray 26 from the non-feeding state to the feeding state. However, there is a case in which, for example, an obstacle is present at the pulled-out position and the sub-tray 58 may not be sufficiently pulled out. In the present modification example, the second tray 62 is configured to be capable of sliding to move by an amount of a distance L5 with respect to the first tray 60 excluding the spring compression length. In a case in which there is an obstacle at the pulled-out position of the sub-tray 58, since the second tray 62 does not completely protrude with respect to the first tray 60 and maintains a state of being in contact with the obstacle at a protrusion length of less than or equal to the distance L5, it is possible to suppress the damage to the sub-tray 58.

Even in a state in which the second tray 62 is in contact with an obstacle, the first tray 60 is switched to a posture corresponding to the feeding state of the document support tray 26. Accordingly, even in a case in which the obstacle is positioned within a displacement region of the second tray 62, this does not impede the switching of the document support tray 26 and the first tray 60 from the non-feeding state to the feeding state. As a result, the switching from the non-feeding state to the feeding state in the document support tray 26 is reliably performed and the document discharge path to the document support tray 26 is reliably opened. Therefore, it is possible to suppress paper jamming in the document transport path 32 which is caused by the document discharge path to the document support tray 26 not being opened.

In the present modification example, the biasing force of the second tray biasing unit 64 is set to be smaller than the force Fb which is received by the link shaft 52 on the bottom end portion 54*b* of the link groove 54. In this configuration, it is possible to suppress the document support tray 26 receiving the biasing force of the second tray biasing unit 64 and the +Y-axis direction side end portion 26*c* of the document support tray 26 lifting up from the support portion 28*d*, and it is possible to suppress a portion of the document transport path 32 being blocked by the document support tray 26.

In the present modification example, a configuration is adopted in which the second tray biasing unit 64 is provided between the first tray 60 and the second tray 62. However, a configuration may be adopted in which the second tray 62 is manually caused to extend and withdraw with respect to the first tray 60 without providing the second tray biasing unit 64.

Third Example

Next, a description will be given of the third example with reference to FIGS. 17 to 19. In the present example, the third example differs from the second example in that the link groove which is provided in the side wall of the base frame in the second example is provided in the document support tray in the third example.

In FIG. 17, a sub-tray 68 is attached to the bottom portion of a document support tray 66 to be capable of sliding movement between the storage position and the pulled-out position. Specifically, a link groove 66*a* is formed in the bottom portion of the document support tray 66. As illustrated in FIG. 18, when the document support tray 66 is in the non-feeding state, the link groove 66*a* is configured as a groove which extends along the Y-axis direction and is inclined downward to the bottom side going from the +Y-axis side toward the −Y-axis side. In the link groove 66*a*, the +Y-axis direction side end portion is an initial end portion 66*b* and the −Y-axis direction side end portion is a terminal end portion 66*c*.

A link shaft 68*a* which engages with the link groove 66*a* is formed on the +Y-axis direction side end portion of the sub-tray 68.

In FIG. 19, when the document support tray 66 is switched from the non-feeding state to the feeding state, the link shaft 68a starts moving from the initial end portion 66b toward the terminal end portion 66c of the link groove 66a. In the present example, the posture of the link groove 66a changes when the document support tray 66 switches from the non-feeding state to the feeding state. Specifically, when the document support tray 66 is in the non-feeding state, the link groove 66a takes a posture going downward to the bottom side from the +Y-axis side toward the −Y-axis side, whereas when the document support tray 66 is in the feeding state, the link groove 66a takes a posture going upward to the top side from the +Y-axis side toward the −Y-axis side.

In the present example, it is possible to cause the link shaft 68a to move to the terminal end portion 66c even if the posture of the link groove 66a changes to upward-facing by using the momentum force which arises when the link shaft 68a moves inside the link groove 66a. A holding portion (not illustrated) which engages with the link shaft 68a to hold the link shaft 68a at the terminal end portion 66c is provided on the terminal end portion 66c. In this configuration, even if the posture of the link groove 66a changes to upward-facing, it is possible to hold the link shaft 68a at the position of the terminal end portion 66c and it is possible to hold the posture of the sub-tray 68.

In the present example, by providing the link groove 66a in the document support tray 66 instead of in the base frame 28, it is possible to shorten the length of the link shaft 68a in the X-axis direction and it is possible to suppress a loss of the transmitted power through the warping of the link shaft 68a.

Modification Example of Third Example

In FIG. 20, a description will be given of the modification example of the third example. In the third example, the link groove 66a is configured such that, when the state of the document support tray 66 is switched, the orientation of the link groove 66a changes from downward-facing to upward-facing. In the present modification example, a link groove 70 is configured to maintain a posture going downward to the bottom side from the +Y-axis side toward the −Y-axis side regardless of the posture of the document support tray 66.

In this configuration, although the region which forms the link groove in the bottom portion of the document support tray 66 increases in size as compared to the third example, since the orientation of the link groove 70 does not change, remaining downward-facing, regardless of the posture of the document support tray 66, it is possible to render the movement of the link shaft 68a smooth and it is possible to maintain the posture of the sub-tray 68 even if the holding portion which holds the link shaft 68a is not provided on the terminal end portion.

Fourth Example

Next, a description will be given of the fourth example with reference to FIGS. 21 to 24. The fourth example differs from the first example in that a sub-tray biasing unit 76 is provided between a document support tray 72 and a sub-tray 74.

A groove portion 72a and a biasing unit attachment portion 72b are provided on the bottom portion of the document support tray 72. The sub-tray 74 is provided with a support portion 74a, a convex portion 74b, a biasing portion 74c, and a restricted portion 74d. Since the configuration of the support portion 74a, the convex portion 74b, and the biasing portion 74c is similar to the configuration of the sub-tray 50 in the first example, the description thereof will be omitted.

In FIG. 21, the sub-tray 74 is attached to the bottom portion of the document support tray 72 to be capable of sliding movement in the Y-axis direction. In the present example, the biasing portion 74c is attached to the groove portion 72a.

The sub-tray biasing unit 76 is attached to the biasing unit attachment portion 72b of the document support tray 72. In the present example, the sub-tray biasing unit 76 biases an end portion 74e of the +Y-axis direction side of the sub-tray 74 in a state in which the sub-tray 74 is stored in the document support tray 72. The sub-tray biasing unit 76 is configured as a coil spring, for example.

In FIGS. 22 and 23, a restricting portion 28f is provided at the position at which the cutout portion 28c is provided on the base frame 28. In the present example, when the sub-tray 74 which is stored in the document support tray 72 in the non-feeding state, that is, when the sub-tray 74 takes a posture which is horizontal along the Y-axis direction, the restricting portion 28f engages with the restricted portion 74d of the sub-tray 74 and restricts the sub-tray 74 from receiving the biasing force of the sub-tray biasing unit 76 and protruding from the storage position to the pulled-out position. In the present example, the restricting portion 28f and the restricted portion 74d configure a restricting unit 78.

In FIG. 24, when the feed tray 24 is to switch from the non-feeding state to the feeding state, the engagement portion 24d starts rotationally moving in the clockwise direction. Accordingly, the document support tray 72 also starts rotationally moving in the counterclockwise direction under its own weight. Together with this operation, the sub-tray 74 which is stored in the bottom portion of the document support tray 72 is displaced in the +Z-axis direction. Accordingly, the restricted portion 74d is displaced to the top side with respect to the restricting portion 28f and the engagement state between the restricted portion 74d and the restricting portion 28f is released. In other words, the restricting state of the restricting unit 78 is released.

As a result, the sub-tray 74 receives the biasing force of the sub-tray biasing unit 76, protrudes from the storage position on the bottom side of the document support tray 72 toward the pulled-out position, and takes a state of being pulled out from the document support tray 72. In this configuration, since not only is the state of the document support tray 72 switched together with the operation of switching the feed tray 24 from the non-feeding state to the feeding state, but the sub-tray 74 is also switched from the storage position to the pulled-out position, it is possible to prevent forgetting to take out the sub-tray 74 from the document support tray 72. Since it is possible to switch the states of the document support tray 72 and the sub-tray 74 by only manipulating the feed tray 24, it is possible to improve the manipulability of the ADF unit 20.

In the present example, when the document support tray 72 is switched from the feeding state to the non-feeding state, since it is not possible to switch the state of the document support tray 72 if the sub-tray 74 is not pushed in from the pulled-out position to the storage position against the biasing force of the sub-tray biasing unit 76, it is possible to prevent forgetting to store the sub-tray 74. In a case in which a physical shock is applied to the ADF unit 20, the printer 10, or the like in a state in which the sub-tray 74 is restricted by the restricting unit 78 (the non-feeding state of the document support tray 72), the restricting unit 78 is capable of preventing or suppressing the protrusion of the sub-tray 74.

Fifth Example

Next, a description will be given of the fifth example with reference to FIGS. 25 to 28. The fifth example differs from the first example in that a push latch mechanism 84 is provided between a document support tray 80 and a sub-tray 82.

In FIG. 25, a groove portion 80a and a push latch mechanism attachment portion 80b are provided on the bottom portion of the document support tray 80. A locking target portion 82a is provided on the +Y-axis direction side end portion of the sub-tray 82 and, regarding the other configuration elements, the sub-tray 82 is provided with the same configuration elements as the sub-tray 58.

In FIGS. 26 and 27, a biasing unit 86 and a locking portion 88 are attached to the push latch mechanism attachment portion 80b of the document support tray 80. In the present example, the push latch mechanism 84 is configured from the locking target portion 82a, the biasing unit 86, and the locking portion 88. The push latch mechanism 84 is configured as a well-known push latch mechanism, for example.

In FIG. 26, the sub-tray 82 is attached to the bottom portion of the document support tray 80 to be capable of sliding movement in the Y-axis direction along the groove portion 80a. In FIG. 26, the sub-tray 82 is positioned at the storage position on the bottom side of the document support tray 80 and the locking target portion 82a is locked to the locking portion 88 of the push latch mechanism 84.

In this state, when the sub-tray 82 is pushed into the +Y-axis direction side, the locking state of the locking portion 88 with respect to the locking target portion 82a is released and the biasing unit 86 is pushed into the +Y-axis direction. Next, as illustrated in FIG. 28, when the force which pushes the sub-tray 82 in the +Y-axis direction is released, the sub-tray 82 is biased to the −Y-axis direction side by the biasing force of the biasing unit 86. As a result, the sub-tray 82 protrudes from the storage position on the bottom side of the document support tray 80 to the pulled-out position on the −Y-axis direction side of the document support tray 80. Accordingly, the sub-tray 82 enters a usable state.

In order to set the sub-tray 82 to the storage state, when the sub-tray 82 is pushed into the +Y-axis direction in FIG. 28, the locking portion 88 engages with the locking target portion 82a and enters the locked state. Accordingly, the sub-tray 82 is stored at the storage position which is positioned on the bottom side of the document support tray 80.

In the present example, since the user is capable of switching the sub-tray 82 between the storage state and the usage state using only the single operation of pushing the sub-tray 82, it is possible to improve the manipulability of the sub-tray 82. Since at least a portion of the push latch mechanism 84 and at least a portion of the sub-tray 82 overlap in the Z-axis direction due to providing the push latch mechanism 84 on the bottom portion of the document support tray 80, it is possible to suppress the apparatus height of the ADF unit 20, and so it is possible to suppress an increase in the apparatus size of the printer 10.

Sixth Example

Next, a description will be given of the sixth example with reference to FIGS. 29 to 32. The sixth example differs from the second example in that an opening-closing portion 90b which is capable of opening and closing a portion of the area at which a cutout portion 90a is provided in an outer edge forming portion 90f of a base frame 90. In FIGS. 29 to 31, the depiction of the document support tray 26 is omitted.

In FIGS. 29 and 30, the cutout portion 90a is formed on the −Y-axis direction side end portion of the base frame 90. A portion of the end portion on the −Y-axis direction side of the base frame 90 in which the cutout portion 90a is formed is configured as the opening-closing portion 90b which is capable of opening and closing using a rotational movement shaft 90c (FIG. 32) as a fulcrum. In FIG. 31, the base frame 90 is provided with a locking portion 90d which engages with a portion of the opening-closing portion 90b to lock the opening-closing operation of the opening-closing portion 90b when the opening-closing portion 90b is in a state of being closed with respect to the base frame 90.

The link shaft 52 which extends in the X-axis direction is attached to the +Y-axis direction side end portion of the sub-tray 50 in FIGS. 29 and 30. The link groove 54 is provided in each of both side walls 90e in the X-axis direction in the base frame 90. Even in the present example, the link shaft 52 and the link groove 54 configure the link mechanism 56 and the link shaft 52 is capable of moving between the top end portion 54a and the bottom end portion 54b of the link groove 54. Since the state changing of the sub-tray 50 by the link mechanism 56 is a similar operation to that of the second example, the description thereof will be omitted.

In FIG. 31, a transmission unit 92 is provided at a position corresponding to the bottom end portion 54b of the link groove 54. In the present example, when the link shaft 52 is positioned at the bottom end portion 54b of the link groove 54, the link shaft 52 engages with a first end portion 92a of the transmission unit 92 and pushes the transmission unit 92 to the −Y-axis direction side. Accordingly, a second end portion 92b of the transmission unit 92 engages with the opening-closing portion 90b which is in the state of being closed with respect to the base frame 90 and pushes the opening-closing portion 90b to the −Y-axis direction side. As a result, the locking state of the locking portion 90d in the opening-closing portion 90b is released and the opening-closing portion 90b rotationally moves to the −Y-axis direction side using the rotational movement shaft 90c as a fulcrum and takes a state of being open with respect to the base frame 90.

In the present example, since it is possible to change the states of the document support tray 26 and the sub-tray 50 and to change the opening-closing portion 90b from the state of being closed to the state of being open with respect to the base frame 90 by only switching the feed tray 24 from the non-feeding state to the feeding state, it is possible to improve the user manipulability.

In FIG. 32, when the opening-closing portion 90b is set to a state of being open with respect to the base frame 90, it becomes possible to access a bottom side region 94 (the region surrounded with the double-dot dashed line in FIG. 32) of the document support tray 26 and the sub-tray 50 which are in the feeding state from the −Y-axis direction side of the base frame 90.

In the present example, it is possible to use the bottom side region 94 as a storage area, for example. For example, spare media, spare ink cartridges, manuals relating to the printer 10, wiring cords, CDR trays, and the like may be stored in the bottom side region 94 which serves as a storage area.

Modification Example of Sixth Example

In FIGS. 33 to 35, a description will be given of the modification example of the sixth example. In FIG. 33, a configuration may be adopted in which a path forming member 96 is provided on the bottom side of the document support tray 26 and the sub-tray 50 in the base frame 90. In FIG. 33, the depiction of the document support tray 26, the sub-tray 50, the link shaft 52, and the transmission unit 92 is omitted.

In the present modification example, it is possible to switch between a first transport state in which the document which is read by the reading unit 42 is guided to the top surface 26a of the document support tray 26 and the support portion 50a of the sub-tray 50 as illustrated in FIG. 34 a second transport state in which the document which is read by the reading unit 42 passes the path forming member 96 and is discharged from the opening-closing portion 90b which is in the open state to the −Y-axis direction side of the ADF unit 20 as illustrated in FIG. 35. The double-dot dashed line to which a reference numeral P-1 is assigned in FIG. 34 indicates the transport path of the document in the first transport state, and the double-dot dashed line to which a reference numeral P-2 is assigned in FIG. 35 indicates the transport path of the document in the second transport state.

Specifically, the first transport state is a state in which the document is transported to the document support tray 26 in the feeding state. Meanwhile, the second transport state is a state in which, after the document support tray 26 is switched from the non-feeding state to the feeding state and the opening-closing portion 90b is rotationally moved to take an open state, the document support tray 26 is again displaced to the top side to form a document transport path 98 which passes the path forming member 96 under the document support tray 26.

In the present example, for example, a configuration is adopted in which the first transport state is adopted in a state in which the sub-tray 50 is pulled out from the document support tray 26 and positioned at the pulled-out position and the second transport state is adopted in a state in which the sub-tray 50 is stored in the document support tray 26. The pulling out operation or the storage operation of the sub-tray 50 may be manual or automatic.

Here, the document is placed on the feed tray 24 before reading and the document is placed on the document support tray 26 after reading. As illustrated in FIG. 4 and the like, since the document is placed in a posture in which both the feed tray 24 and the document support tray 26 which are in the feeding state are inclined, there is a case in which a user mistakes a document before reading and a document after reading for each other. In the present modification example, in the second transport state, since a configuration is adopted in which the document for which the reading is completed may be removed from the side of the ADF unit 20, it is not easy to mistake a document before reading and a document after reading for each other and it is possible to improve the visual recognition properties for the user. Since the user can select the desired transport state, the usability is improved.

Modification Examples of Examples (1) In the second example (FIGS. 11 to 16), the third example (FIGS. 17 to 20), and the sixth example (FIGS. 29 to 35), a configuration is adopted in which the document support tray 26, 66 switches from the non-feeding state to the feeding state and the sub-tray 50, 68 is pulled out from the storage position to the pulled-out position in accordance of the switching of the feed tray 24 from the non-feeding state to the feeding state. However, instead of this configuration, a configuration may be adopted in which the feed tray 24 and the document support tray 26, 66 is switched from the non-feeding state to the feeding state or from the feeding state to the non-feeding state by manipulating the sub-tray 50, 68.

Specifically, when the feed tray 24, the document support tray 26, 66 is in the non-feeding state, by pulling out the sub-tray 50, 68 from the storage position to the pulled-out position, the document support tray 26, 66 is switched from the non-feeding state to the feeding state by the link mechanism 56 and the like. In accordance with the state switching of the document support tray 26, 66, since the feed tray 24 takes a posture in which the +Y-axis direction side end portion 24e is lifted from the top surface 20a of the ADF unit 20 from the non-feeding state (the horizontal posture along the Y-axis direction), it is possible to render the state switching of the feed tray 24 easy. In this configuration, since the +Y-axis direction side end portion 24e lifts up from the top surface 20a when the feed tray 24 is switched from the non-feeding state to the feeding state, it is no longer necessary to provide the recessed portion 29a of the ADF cover 29, it is possible to reduce the unevenness on the top surface 20a of the ADF unit 20, and it is possible to improve the flatness.

Meanwhile, when the feed tray 24 and the document support tray 26, 66 are in the feeding state, the sub-tray 50, 68 is stored at the storage position from the pulled-out position, and thus, the document support tray 26, 66 is switched from the feeding state to the non-feeding state by the link mechanism 56 and the like. A configuration may be adopted in which, by providing a link mechanism (not illustrated), for example, between the feed tray 24 and the document support tray 26, 66, the feed tray 24 is also switched from the feeding state to the non-feeding state in accordance with the operation of switching the document support tray 26, 66 from the feeding state to the non-feeding state.

(2) In the sixth example (FIGS. 29 to 35), when the feed tray 24 and the document support tray 26 are in the non-feeding state, the document support tray 26 may be switched to the feeding state via the link mechanism 56 and the opening-closing portion 90b may be opened with respect to the base frame 90 by pulling out the sub-tray 50 from the storage position to the pulled-out position. A configuration may be adopted in which, when the sub-tray 50 which is in the state of being pulled out to the pulled-out position is returned to the storage position, the opening-closing portion 90b which is in a state of being opened with respect to the base frame 90 is closed with respect to the base frame 90 by the link mechanism and the like (not illustrated) in accordance with the operation of the sub-tray 50.

(3) In the present example, "the medium support tray" is configured as the document support tray 26 (FIG. 2), 66 (FIG. 17), 72 (FIG. 21), or 80 (FIG. 25). However, "the medium support tray" may be configured as the feed tray 24.

To summarize the description, the ADF unit 20 is provided with the base frame 28 which includes the outer edge forming portion 28a which configures the outer edge of the device top surface, the document support tray 26 (FIG. 2), 66 (FIG. 17), 72 (FIG. 21), 80 (FIG. 25) which is a tray which supports the document, is capable of switching between a horizontal posture and an inclined posture, and forms a portion of the top surface 28b of the outer edge forming portion 28a and a portion of the top surface 20a of the flat ADF unit 20 in the horizontal posture, and the sub-tray 50 (FIG. 2), 58 (FIG. 15), 68 (FIG. 17), 74 (FIG. 21), 82 (FIG. 25) which is capable of being displaced between the storage position at which the sub-tray 50, 58, 68, 74, 82 is stored on the bottom side of the document support tray 26, 66, 72, 80 and a pulled-out position at which the sub-tray 50, 58, 68, 74, 82 is pulled out from the bottom side of the document support tray 26, 66, 72, 80, and supports the document together with the document support tray 26, 66, 72, 80 at the pulled-out position, in which the sub-tray 50, 58, 68, 74, 82 which includes the convex portion 50b (FIG. 2), 62b (FIG. 15), 74b (FIG. 21) which configures a portion of the top surface 20a of the flat ADF unit 20 together with the top surface 28b of the outer edge forming portion 28a at the storage position, and in which the convex portion 50b (FIG. 2), 62b (FIG. 15), 74b (FIG. 21) maintains the same height level between the storage position and the pulled-out position due to the sub-tray 50, 58, 68, 74, 82 sliding along a direction which is parallel to the top surface 20a of the ADF unit 20 in a state in which the document support tray 26, 66, 72, 80 takes the horizontal posture.

In this configuration, since the convex portion 50b, 62b, 74b maintains the same height level between the storage position and the pulled-out position due to the sub-tray 50, 58, 68, 74, 82 sliding along a direction which is parallel to the top surface 20a of the ADF unit 20 in a state in which the document support tray 26, 66, 72, 80 takes the horizontal posture, whether the sub-tray 50, 58, 68, 74, 82 is at the storage position or the pulled-out position, the flatness of the top surface 20a of the ADF unit 20 is maintained and it is possible to stably place a medium or the like on the top surface 20a of the ADF unit 20.

Additionally, if the sub-tray 50, 58, 68, 74, 82 is pulled out to the pulled-out position, the region in which the medium or the like can be placed expands, and for example, even if the medium or the like is a long medium which exceeds the length of the ADF unit 20 in the Y-axis direction, it is possible to more favorably place the medium on the top surface 20a of the ADF unit 20.

The expression "flat device top surface" does not mean in a strict sense that the device top surface is flat, but means that the device top surface has an overall flat shape even including a little unevenness and that a degree of flatness is maintained at which a medium does not easily slip off even if the medium is placed on the device top surface.

In the ADF unit 20, the cutout portion 28c is formed in the outer edge forming portion 28a and the convex portion 50b (FIG. 2), 62b (FIG. 15), 74b (FIG. 21) of the sub-tray 50, 58, 68, 74, and 82 fills the cutout portion 28c at the storage position to configure a portion of the top surface 20a of the flat ADF unit 20 together with the top surface 28b of the outer edge forming portion 28a.

At least the top surface 28b of the outer edge forming portion 28a and the top surface of the convex portion 50b, 62b, 74b are embossed surfaces. In this configuration, in a case in which a medium or the like is placed on the top surface 20a of the ADF unit 20, a slipping suppression effect is obtained and it is possible to more stably place the medium or the like on the top surface 20a of the ADF unit 20.

The document support tray 26 switches between the inclined posture (the feeding state) and the horizontal posture (the non-feeding state) by rocking and the sub-tray 50 is capable of being displaced to the pulled-out position regardless of the posture of the document support tray 26.

The ADF unit 20 further includes the link mechanism 56 which displaces the sub-tray 50 in accordance with the posture changing of the document support tray 26. In this configuration, it is not necessary to individually manipulate the document support tray 26 and the sub-tray 50 and the manipulability is improved.

When the document support tray 26 (FIG. 2), 66 (FIG. 17) takes the horizontal posture (the non-feeding state) and the document support tray 26, 66 performs posture switching from a state in which the sub-tray 50 (FIG. 2), 58 (FIG. 15), 68 (FIG. 17) is at the storage position toward the inclined posture (the feeding state), the sub-tray 50, 58, 68 is pulled out from the bottom side of the document support tray 26, 66 and is displaced to the pulled-out position. In this configuration, it is possible to displace the sub-tray 50, 58, 68 to the pulled-out position.

When the document support tray 26 (FIG. 2), 66 (FIG. 17) takes the inclined posture (the feeding state) and the document support tray 26, 66 performs posture switching from a state in which the sub-tray 50 (FIG. 2), 58 (FIG. 15), 68 (FIG. 17) is at the pulled-out position toward the horizontal posture (the non-feeding state), the sub-tray 50, 58, 68 is displaced from the pulled-out position to the storage position. In this configuration, it is possible to displace the sub-tray 50, 58, 68 to the storage position.

The posture of the document support tray 26 (FIG. 2), 66 (FIG. 17) is restricted by the sub-tray 50 (FIG. 2), 58 (FIG. 15), 68 (FIG. 17) and the document support tray 26, 66 changes posture in accordance with the displacement operation of the sub-tray 50, 58, 68. In this configuration, since the document support tray 26, 66 changes posture by manipulating the sub-tray 50, 58, 68 instead of manipulating the document support tray 26, 66, the manipulability is still further improved.

The sub-tray 58 (FIG. 15) is configured to include the first tray 60, the second tray 62 which is capable of sliding with respect to the first tray 60 and is provided with the convex portion 62b, and the second tray biasing unit 64 which biases the second tray 62 in a direction in which the second tray 62 protrudes from the first tray 60.

In this configuration, since the sub-tray 58 is configured by a plurality of members (at least the first tray 60 and the second tray 62) and the second tray 62 is biased in a direction in which the second tray 62 protrudes from the first tray 60, it is possible to suppress an impedance to the posture changing of the document support tray 26 even if the sub-tray 58 abuts on an obstacle or the like when the sub-tray 58 is displaced to the pulled-out position in accordance with the posture changing of the document support tray 26 using the action of the link mechanism 56. In addition, it is possible to suppress the damage to the sub-tray 58 and the link mechanism 56.

The ADF unit 20 further includes the sub-tray biasing unit 76 which biases the sub-tray 74 toward the pulled-out position, and the restricting unit 78 which restricts displacement of the sub-tray 74 from the storage position to the pulled-out position in a state in which the document support tray 72 is in the horizontal posture (the non-feeding state), and when the document support tray 72 performs posture switching toward the inclined posture (the feeding state) from a state in which the document support tray 72 takes the horizontal posture and the sub-tray 74 is at the storage position, positional restriction of the sub-tray 74 by the restricting unit 78 is released and the sub-tray 74 is displaced from the storage position to the pulled-out position by a biasing force of the sub-tray biasing unit 76.

In this configuration, when the document support tray 72 performs the posture switching toward the inclined posture (the feeding state), since a configuration is adopted in which the positional restriction of the sub-tray 74 by the restricting unit 78 is released and the sub-tray 74 is displaced from the storage position to the pulled-out position by the biasing force of the sub-tray biasing unit 76, it is possible to displace the sub-tray 74 to the pulled-out position without manipulating the sub-tray 74 and the manipulability is improved.

The ADF unit 20 further includes the push latch mechanism 84 which releases holding of the sub-tray 82 at the storage position by a pushing-in manipulation of the sub-tray 82 which is at the storage position and biases the sub-tray 82 toward the pulled-out position. In this configuration, it is possible to pull out the sub-tray 82 to the pulled-out position with easy manipulability.

At least a portion of an area in which the cutout portion 90a is formed in the outer edge forming portion 90f of the base frame 90 is configured as the opening-closing portion 90b which is capable of opening and closing. In this configuration, it is possible to use the inside space (the bottom side region 94) of the base frame 90 by opening the opening-closing portion 90b. For example, it is possible to form the document transport path 98 at the bottom side of the sub-tray 50 and discharge the document via the opening-closing portion 90b. It is possible to use the inside space (the bottom side region 94) of the base frame 90 as a storage area.

The document transport path 98 in which the document is transported is positioned in the bottom side region 94 of the sub-tray 50. The document support tray 26 (FIG. 2), 66 (FIG. 17), 72 (FIG. 21), 80 (FIG. 25) is a tray which supports the document which is subjected to reading and is discharged.

The top surface 20a of the flat ADF unit 20 is formed by at least the document support tray 26 (FIG. 2), 66 (FIG. 17), 72 (FIG. 21), 80 (FIG. 25) which is in the horizontal posture (the non-feeding state), the outer edge forming portion 28a, 90f, the convex portion 50b (FIG. 2), 62b (FIG. 15), 74b (FIG. 21), the feed tray 24 which is positioned closer to a downstream side in a document feed direction than the document support tray 26, 66, 72, 80 and supports the document which is fed, and the ADF cover 29 which is positioned closer to the downstream side in the document feed direction than the feed tray 24 and opens and closes at least a portion of the document transport path 32.

The feed tray 24 which serves as a medium support tray is a tray which supports the medium which is fed.

The scanner unit 16 is provided with the reading unit 42 which reads the document and the ADF unit 20.

The invention is not limited to the examples and may be modified in various ways within the scope of the invention described in the claims, and the modifications should be construed as being included in the invention.

The entire disclosure of Japanese Patent Application No.2017-089979, filed Apr. 28, 2017 is expressly incorporated by reference herein.

What is claimed is:

1. A medium transport device, comprising:
    a base frame which includes an outer edge forming portion which configures an outer edge of a device top surface;
    a medium support tray that supports a medium, is capable of switching between a horizontal posture and an inclined posture, and forms a portion of the flat device top surface together with a top surface of the outer edge forming portion in the horizontal posture; and
    a sub-tray which is capable of being displaced between a storage position at which the sub-tray is stored on a bottom side of the medium support tray and a pulled-out position at which the sub-tray is pulled out from the bottom side of the medium support tray, and supports the medium together with the medium support tray at the pulled-out position,
    wherein the sub-tray includes a convex portion which configures a portion of the flat device top surface together with a top surface of the outer edge forming portion at the storage position, and
    wherein the sub-tray is capable of being displaced along a direction that is parallel to the device top surface in a state in which the medium support tray takes the horizontal posture.

2. The medium transport device according to claim 1, wherein a cutout portion is formed in the outer edge forming portion, and
    wherein the convex portion of the sub-tray fills the cutout portion at the storage position to configure a portion of the flat device top surface together with the top surface of the outer edge forming portion.

3. An image reading apparatus, comprising:
    a reader which reads a medium; and
    the medium transport device according to claim 2.

4. The medium transport device according to claim 1,
    wherein at least the top surface of the outer edge forming portion and the top surface of the convex portion are embossed surfaces.

5. An image reading apparatus, comprising:
    a reader which reads a medium; and
    the medium transport device according to claim 4.

6. The medium transport device according to claim 1,
    wherein the medium support tray switches between the inclined posture and the horizontal posture by rocking, and
    wherein the sub-tray is capable of being displaced to the pulled-out position regardless of the posture of the medium support tray.

7. The medium transport device according to claim 6, further comprising:
    a link mechanism which displaces the sub-tray in accordance with posture changing of the medium support tray.

8. The medium transport device according to claim 7,
    wherein when the medium support tray takes the horizontal posture and the medium support tray performs posture switching toward the inclined posture from a state in which the sub-tray is at the storage position, the sub-tray is pulled out from the bottom side of the medium support tray and is displaced to the pulled-out position.

9. The medium transport device according to claim 7,
    wherein when the medium support tray takes the inclined posture and the medium support tray performs posture switching toward the horizontal posture from a state in which the sub-tray is at the pulled-out position, the sub-tray is displaced from the pulled-out position to the storage position.

10. The medium transport device according to claim 7,
    wherein the posture of the medium support tray is restricted by the sub-tray and the medium support tray changes posture in accordance with a displacement operation of the sub-tray.

11. The medium transport device according to claim 7,
    wherein the sub-tray is configured to include
        a first tray,
        a second tray which is capable of sliding with respect to the first tray and is provided with the convex portion, and
        a second tray biasing unit which biases the second tray in a direction in which the second tray protrudes from the first tray.

12. An image reading apparatus, comprising:
a reader which reads a medium; and
the medium transport device according to claim 6.

13. The medium transport device according to claim 1, further comprising:
a sub-tray biasing unit which biases the sub-tray toward the pulled-out position; and
a restricting unit which restricts displacement of the sub-tray from the storage position to the pulled-out position in a state in which the medium support tray is in the horizontal posture,
wherein when the medium support tray performs posture switching toward the inclined posture from a state in which the medium support tray takes the horizontal posture and the sub-tray is at the storage position, positional restriction of the sub-tray by the restricting unit is released and the sub-tray is displaced from the storage position to the pulled-out position by a biasing force of the sub-tray biasing unit.

14. The medium transport device according to claim 1, further comprising:
a push latch mechanism which releases holding of the sub-tray at the storage position by a pushing-in manipulation of the sub-tray which is at the storage position and biases the sub-tray toward the pulled-out position.

15. The medium transport device according to claim 1, wherein at least a portion of an area in which the cutout portion is formed in the outer edge forming portion of the base frame is configured as an opening-closing portion which is capable of opening and closing.

16. The medium transport device according to claim 1, wherein a medium transport path for transporting the medium is positioned in a bottom side region of the sub-tray.

17. The medium transport device according to claim 1, wherein the medium support tray is a tray which supports the medium which is subjected to reading and is discharged.

18. The medium transport device according to claim 17, wherein the flat device top surface is formed by at least
the medium support tray which is in the horizontal posture,
the outer edge forming portion,
the convex portion,
a feed tray which is positioned closer to a downstream side in a medium feed direction than the medium support tray and supports the medium which is fed, and
an opening-closing body which is positioned closer to the downstream side in the medium feed direction than the feed tray and opens and closes at least a portion of a medium transport path.

19. The medium transport device according to claim 1, wherein the medium support tray is a tray which supports the medium which is fed.

20. An image reading apparatus, comprising:
a reader which reads a medium; and
the medium transport device according to claim 1.

* * * * *